Figure 1:
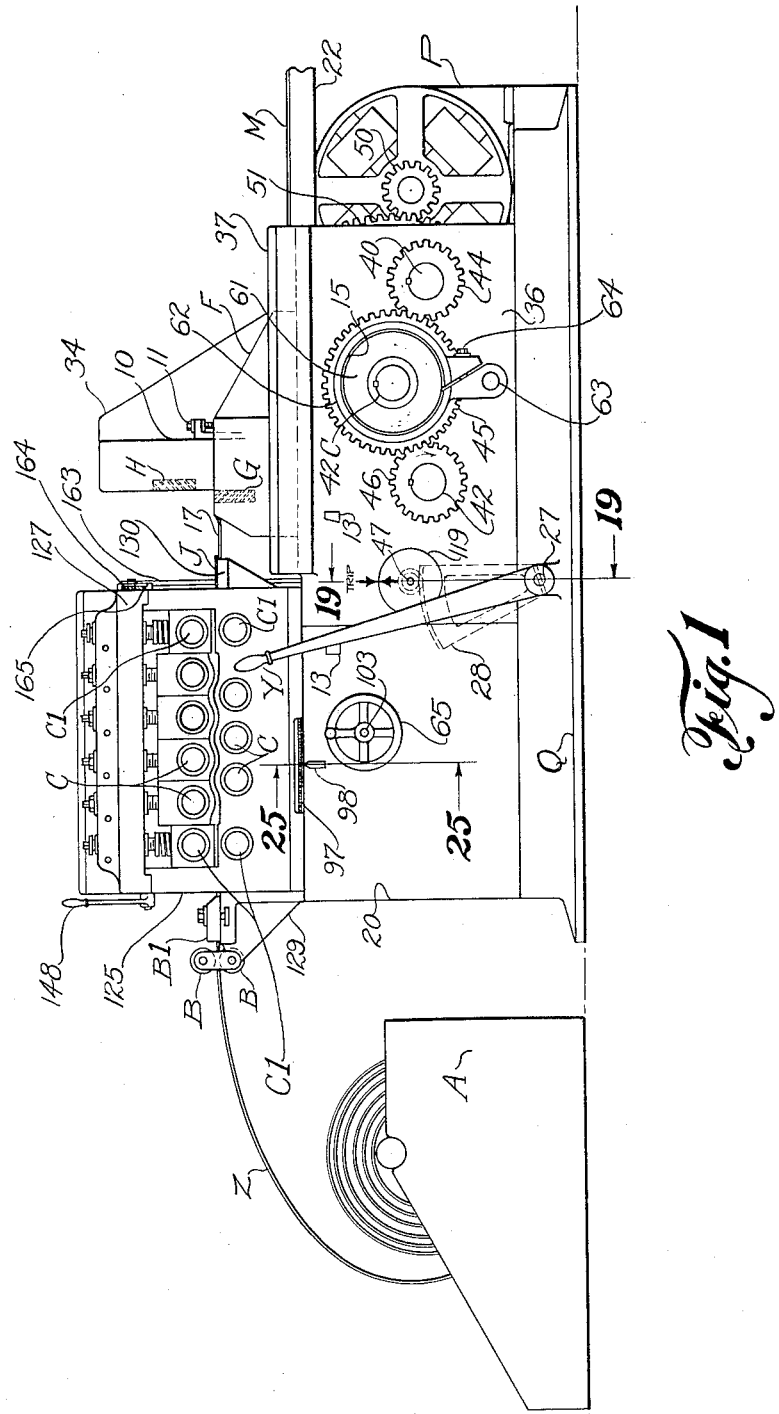

July 4, 1933. J. H. ROBERTS 1,916,991
LONG STOCK FABRICATING MACHINE
Filed May 23, 1929 12 Sheets-Sheet 1

INVENTOR
Joseph H. Roberts
BY Philip Farnsworth
ATTORNEY

July 4, 1933.   J. H. ROBERTS   1,916,991
LONG STOCK FABRICATING MACHINE
Filed May 23, 1929   12 Sheets-Sheet 3

INVENTOR
Joseph H. Roberts
BY
Philip Farnsworth
ATTORNEY

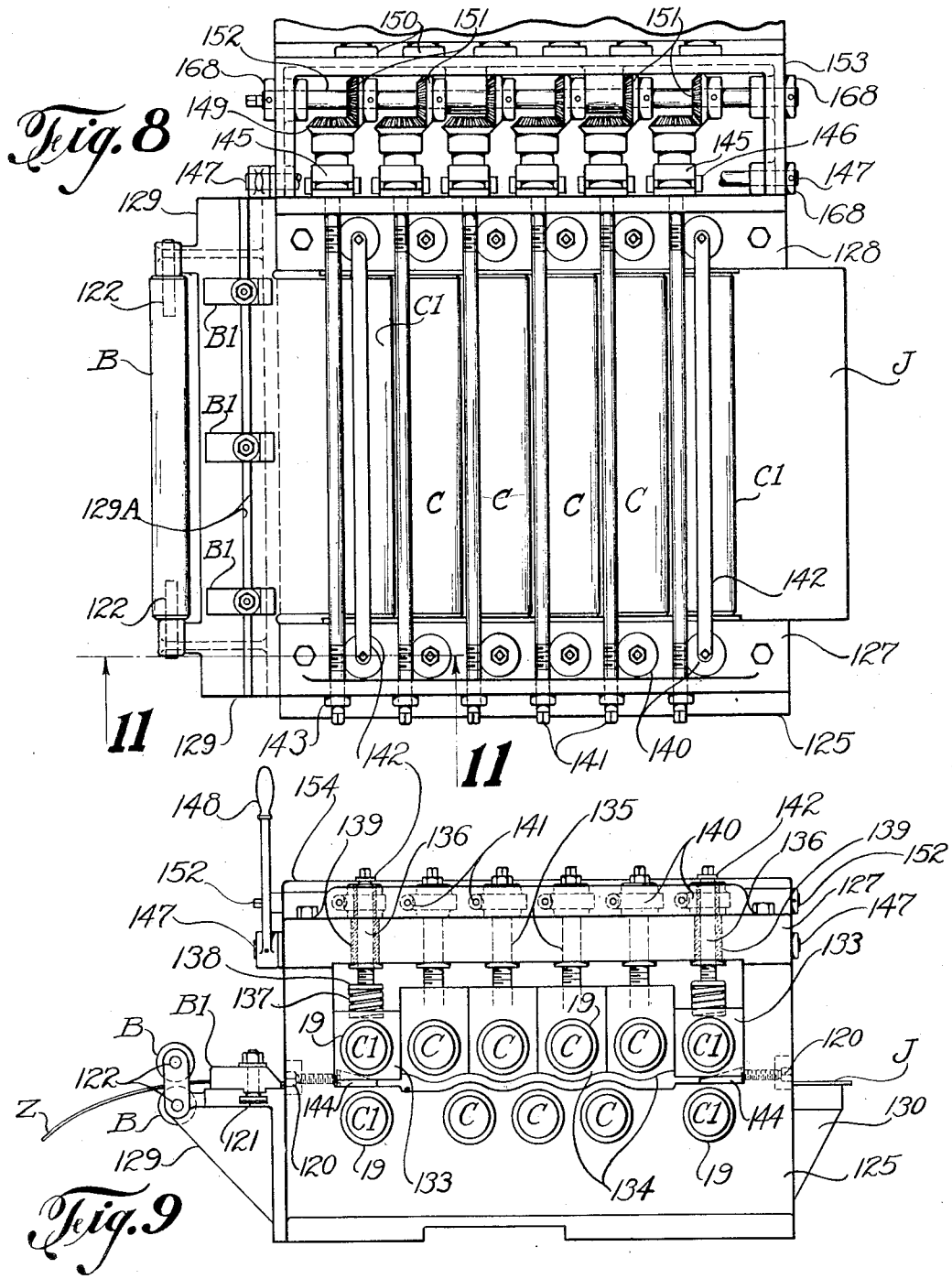

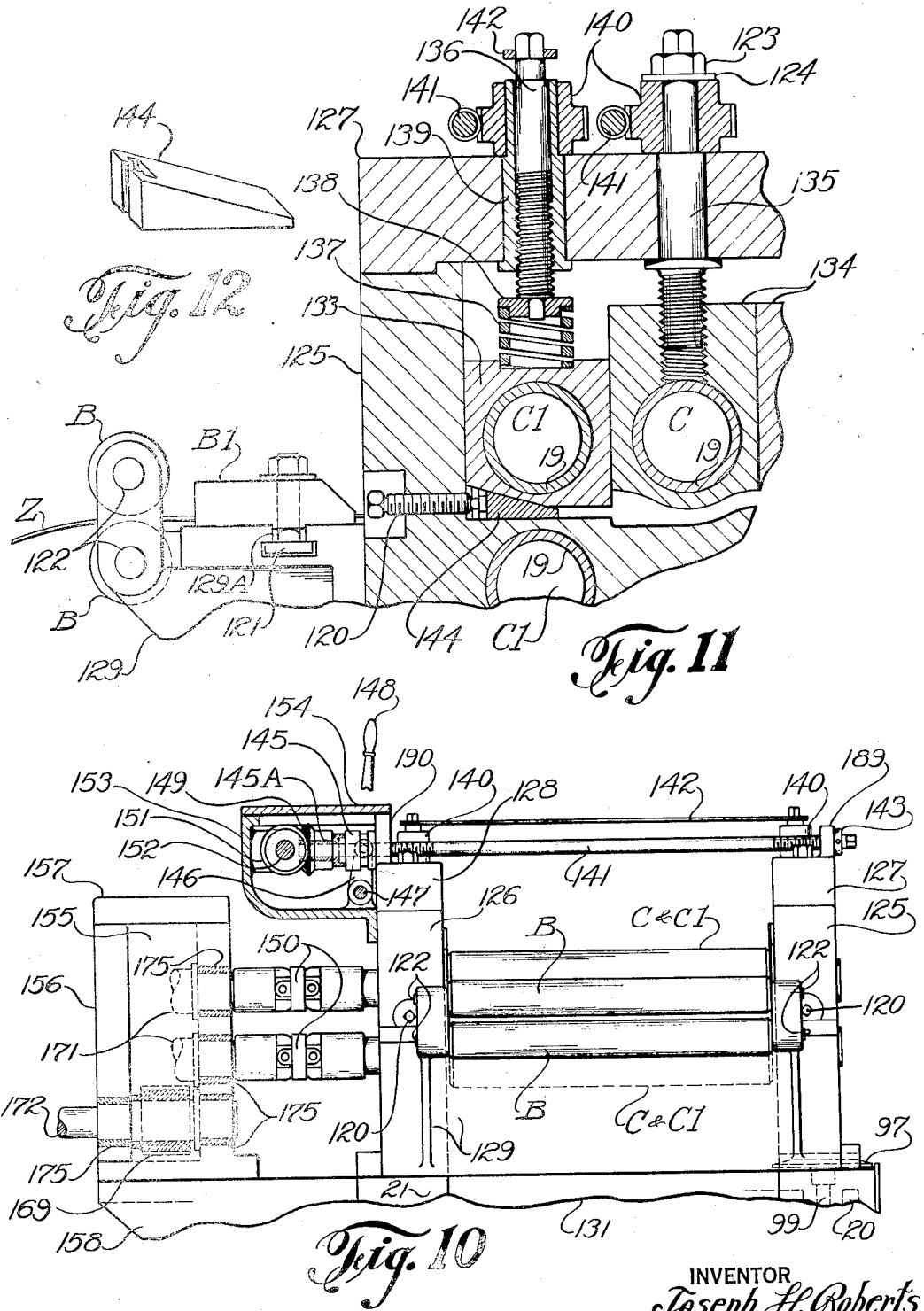

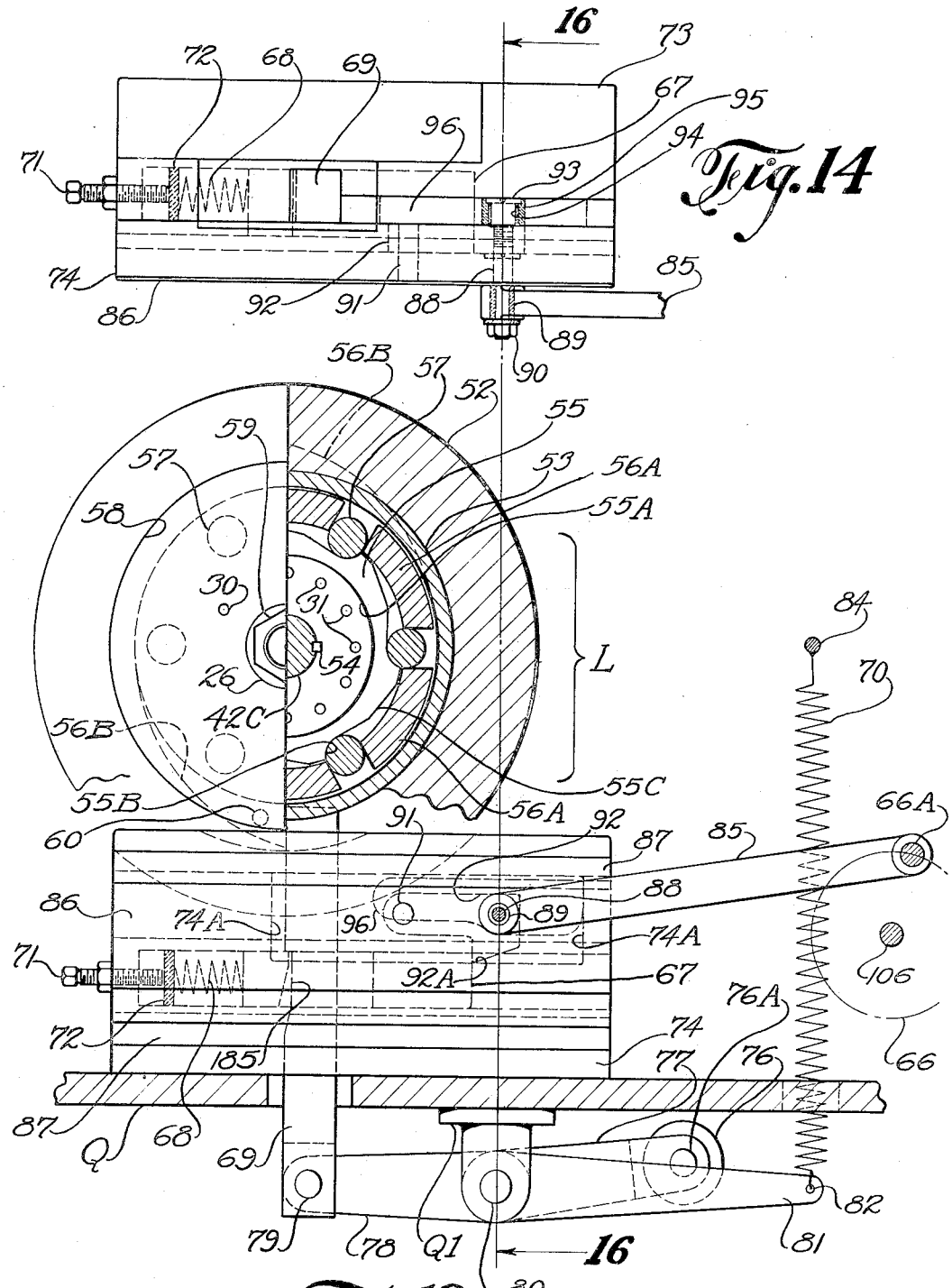

July 4, 1933. J. H. ROBERTS 1,916,991
LONG STOCK FABRICATING MACHINE
Filed May 23, 1929 12 Sheets-Sheet 9

INVENTOR
Joseph H. Roberts
BY
Philip Farnsworth
ATTORNEY

July 4, 1933.  J. H. ROBERTS  1,916,991
LONG STOCK FABRICATING MACHINE
Filed May 23, 1929  12 Sheets-Sheet 10

INVENTOR
Joseph H. Roberts
BY
Philip Farnsworth
ATTORNEY

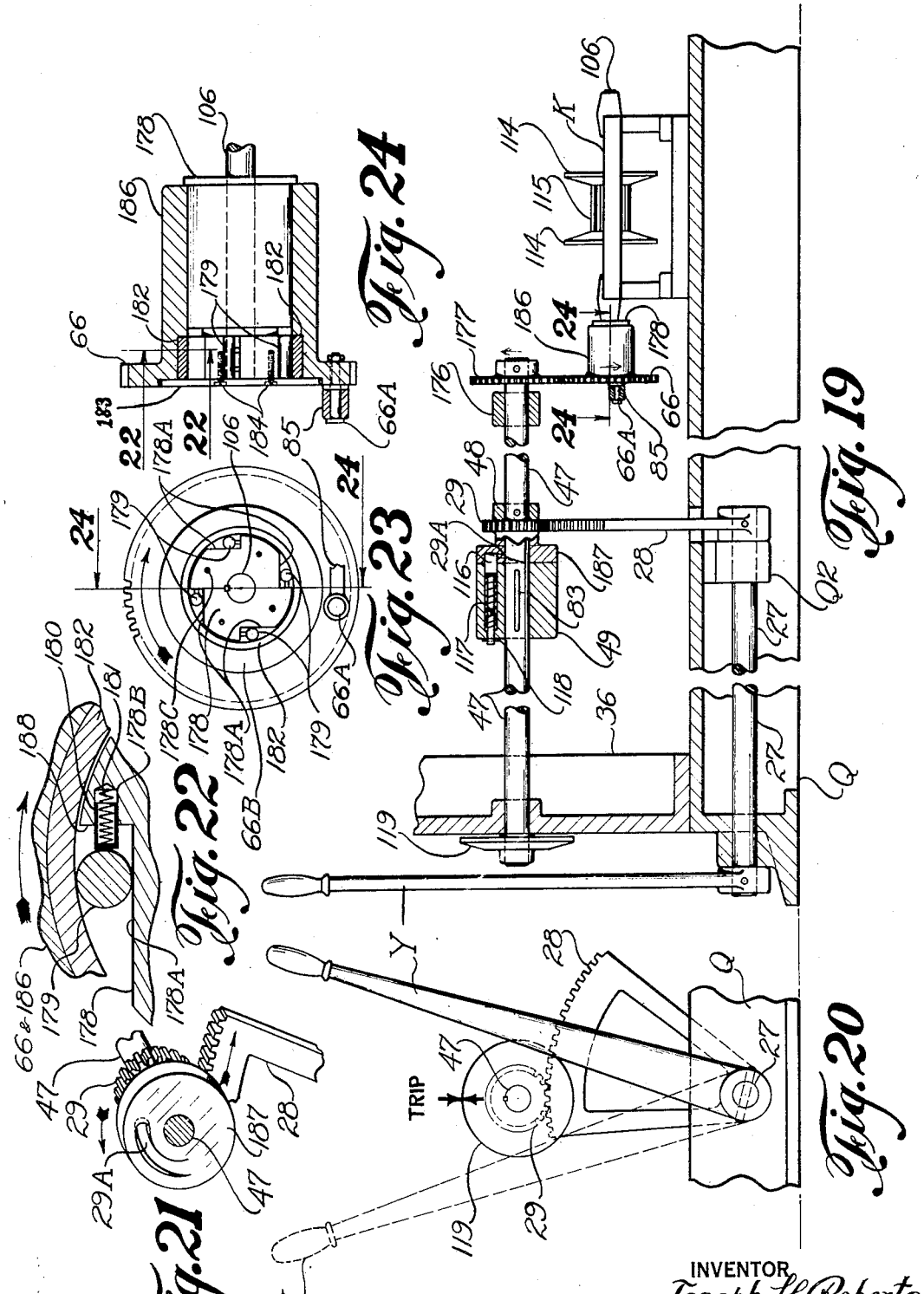

July 4, 1933.  J. H. ROBERTS  1,916,991

LONG STOCK FABRICATING MACHINE

Filed May 23, 1929  12 Sheets-Sheet 12

INVENTOR
Joseph H. Roberts
BY
Philip Farnsworth
ATTORNEY

Patented July 4, 1933

1,916,991

UNITED STATES PATENT OFFICE

JOSEPH H. ROBERTS, OF WATERBURY, CONNECTICUT, ASSIGNOR TO F. B. SHUSTER CO., INC., OF NEW HAVEN, CONNECTICUT, A CORPORATION

LONG STOCK FABRICATING MACHINE

Application filed May 23, 1929. Serial No. 365,528.

This invention relates to machines for fabricating long metal stock sometimes hundreds of feet long, more particularly such as sheet steel known as "strip steel" and usually in the form of coils from the mill, wherein such stock, as it travels linearly thru the present machine, is subjected at successive portions of its length to a fabricating operation or successively to a plurality of fabricating operations such as punching, shearing, etc., particularly where any such kind of fabrication is effected on successive portions of the length of the strip which are uniformly separated from one another, as in the exemplary machine of the drawings where the long relatively narrow "strip steel" is fed to shearing apparatus which operates so that uniform lengths are cut successively from the successively forward or van end portions of the long strip, notwithstanding that the shearing apparatus is reciprocatory and moves in a direction opposite to the feed of the long strip as a preliminary to the shearing operation which is conducted while the long strip is in its normal feeding motion without any stoppage or slowing up of the strip-feed relative to the motion of the shearing mechanism; the shearing mechanism at the instant of shearing being moved in the same direction as the feed of long strip and at the same rate. While the present invention relates more particularly to such fabrication of strip steel, yet certain features disclosed may be employed in machines designed for fabrication of other forms of long relatively narrow metal stock such as rods, tubes, etc.

More specifically the invention relates to such machines as the above wherein the long metal strip is subjected to the action of flattening or straightening means as it is being fed to the shearing mechanism or forward to or forward from other fabricating devices, as a portion of the total fabrication necessary to obtain uniform distances between the successive final operations such as shearing, etc.

An object of the invention is to improve the construction and operation of the above type of machines, i. e., machines for fabricating long strip steel at successive linear portions of the strip, particularly shearing into relatively short strips of equal length designed for sales as standard steel stock to various manufacturers. More specifically the object and result are the machine shown which is of relatively simple construction and operation and low cost and has a design which produces the best quality of fabrication, all by means of automatic and manual operation in general accord with the best modern mill practice.

In accordance with the present invention and in the exemplary machine which operates on the long, relatively narrow "strip steel," the long stock or specifically the long strip is fed continuously (without cessation of feed of the strip to permit shearing thereof while the strip is stationary as heretofore commonly practiced) the shearing being effected by a comparatively light but powerful traveling, flying, aerial or reciprocating mechanism including a shear-stand which intermittently is given horizontal excursions which are short as to distance and time, (and involve both horizontal and vertical motions of an upper shear-member or tool) at successive occasions after intervals of rest of the reciprocating mechanism during which periods of rest occurs the continuous feed of most of the length of the strip; the strip continuing to be fed also during such excursions of reciprocation and continuously as long as the machine as a whole is in operation and at a rate of fifty feet or so per minute up to several hundred feet per minute. During each of the short horizontal excursions of said aerial shear-stand (each much shorter than the sheared sub-length of stock) its doubly-reciprocating tool is operated vertically toward the strip to cut off a portion of the forward end of the latter while the entire length of the strip in the entrance portion of the machine as a whole continues in normal feeding motion. Furthermore the successive relatively short lengths cut from a long (initially coiled) length of strip are of uniform linear dimensions owing to the fact that the elements of the machine are so constructed and arranged that the excursions of the reciprocatory shearing tools are coordinated with the rate of feed of the long strip and the strip has had its curvature removed just before the shearing operation. And adjustments are provided so that the operator at will can select any desired linear dimension within wide limits for the desired uniform lengths of the cut strips for a given job. This operation of the traveling shear avoids the need of interrupting or varying the strip-feed and thereby (without requiring bodily movement of the feeding means) permits, within a given time, an increase of at least several inches of strip-feed for each shear-cut, as compared with prior machines wherein the feed was intermitted or varied to permit shearing by mechanism which did not travel with the stock; so that, assuming, for example, about ten to fifty cuts of the long strip per minute, more or less, there is an increased output from the new machine hereof (as compared with such a prior machine having a stationary shear), of several feet of strip per minute, which amounts to an increase per day of thousands of feet of strip per machine without any speeding up of the strip-feeding means to an undesirable degree, and without any need of bodily moving the feeding means to prevent feeding action against the shear during the shearing operation.

Figure 2:
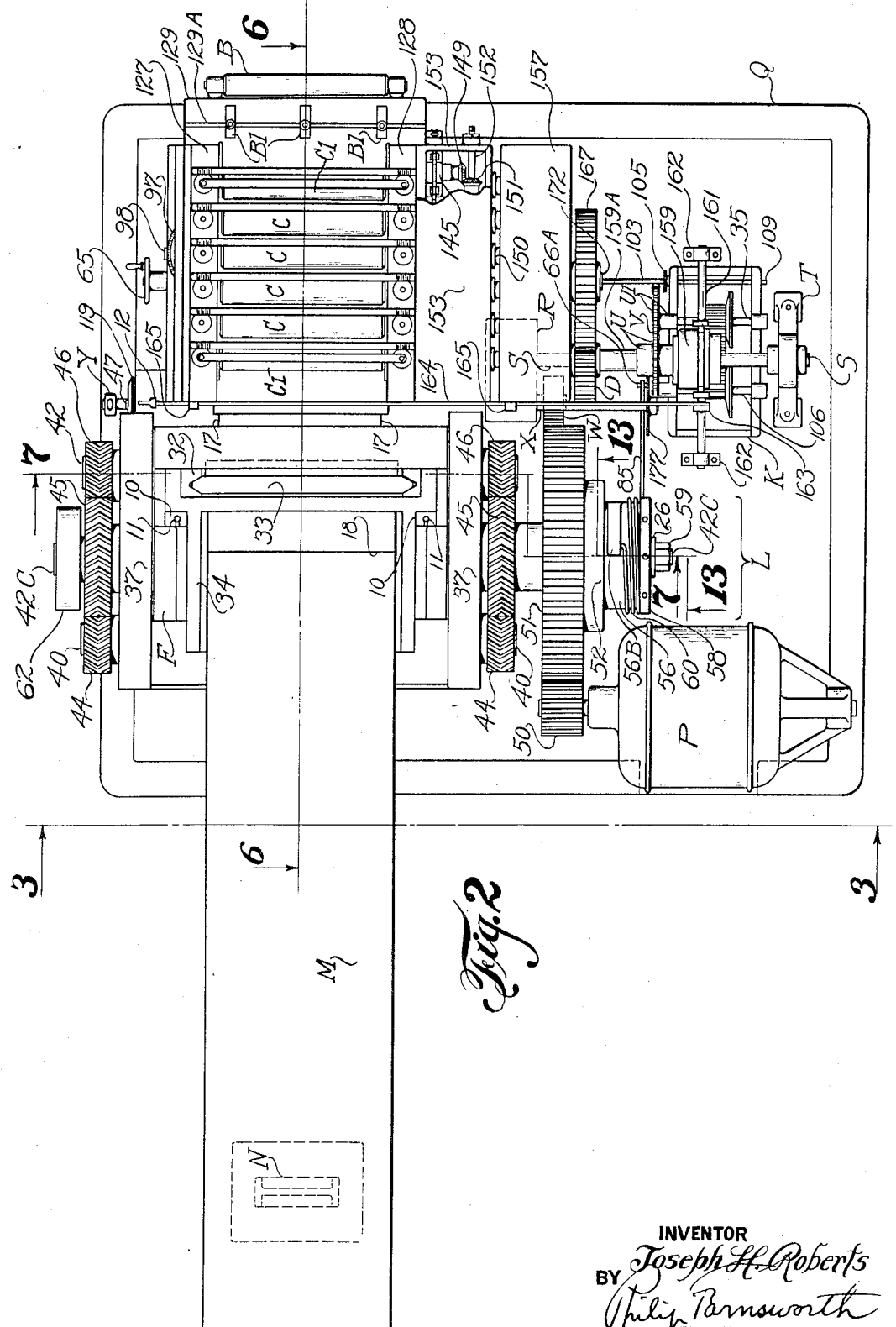
Figures 3, 4:
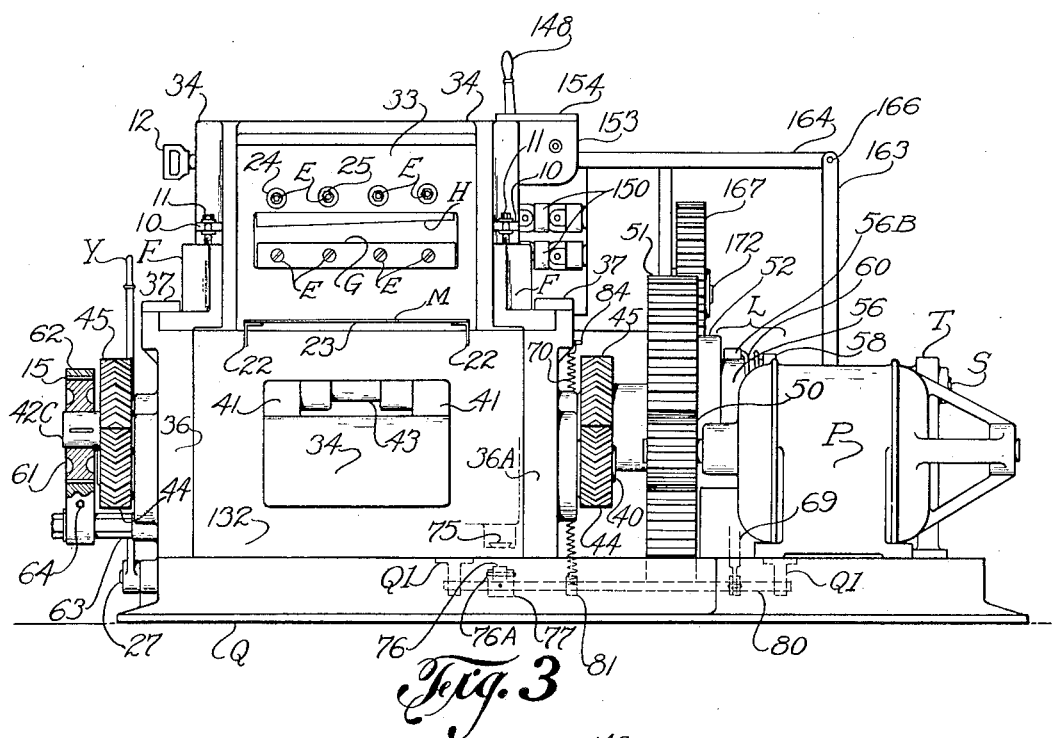
Figure 5:
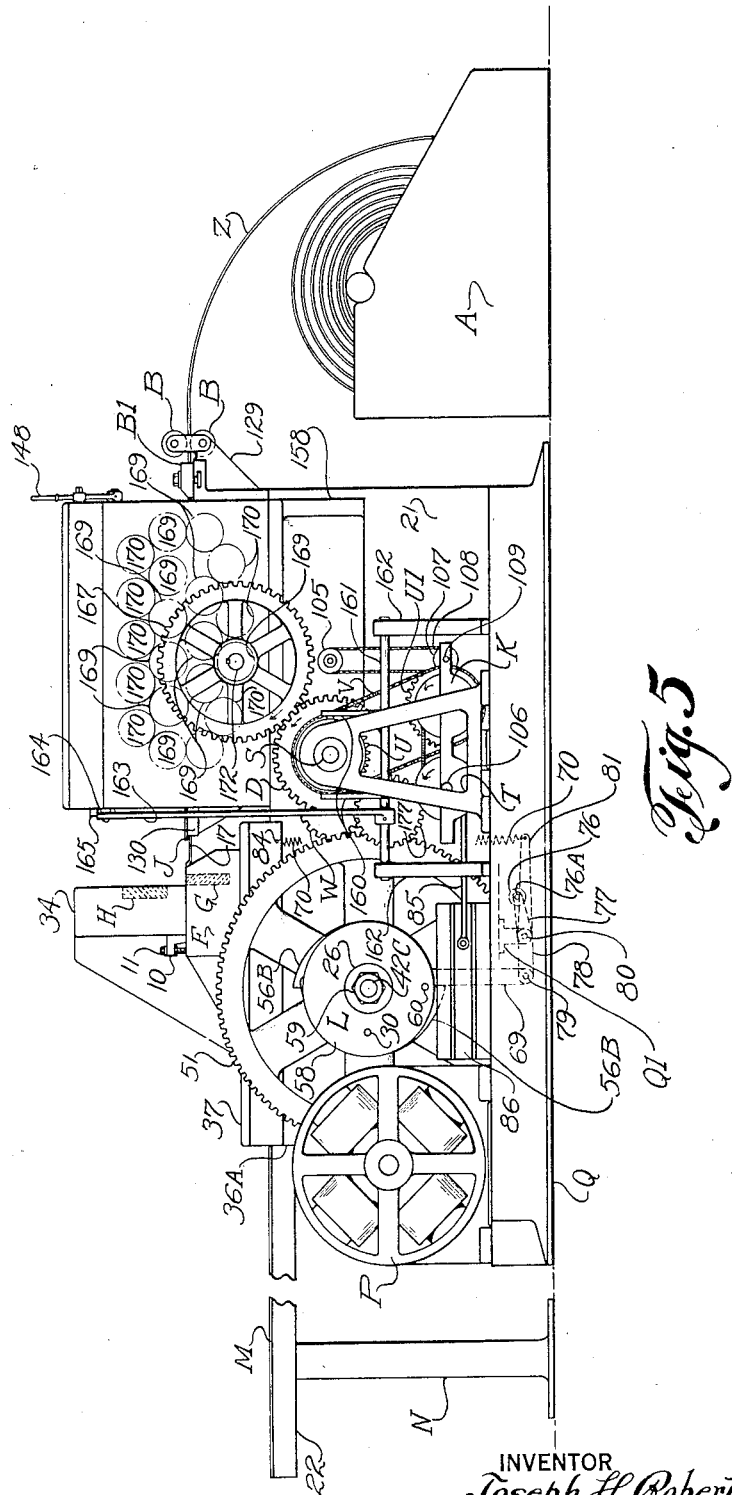
Figure 6:
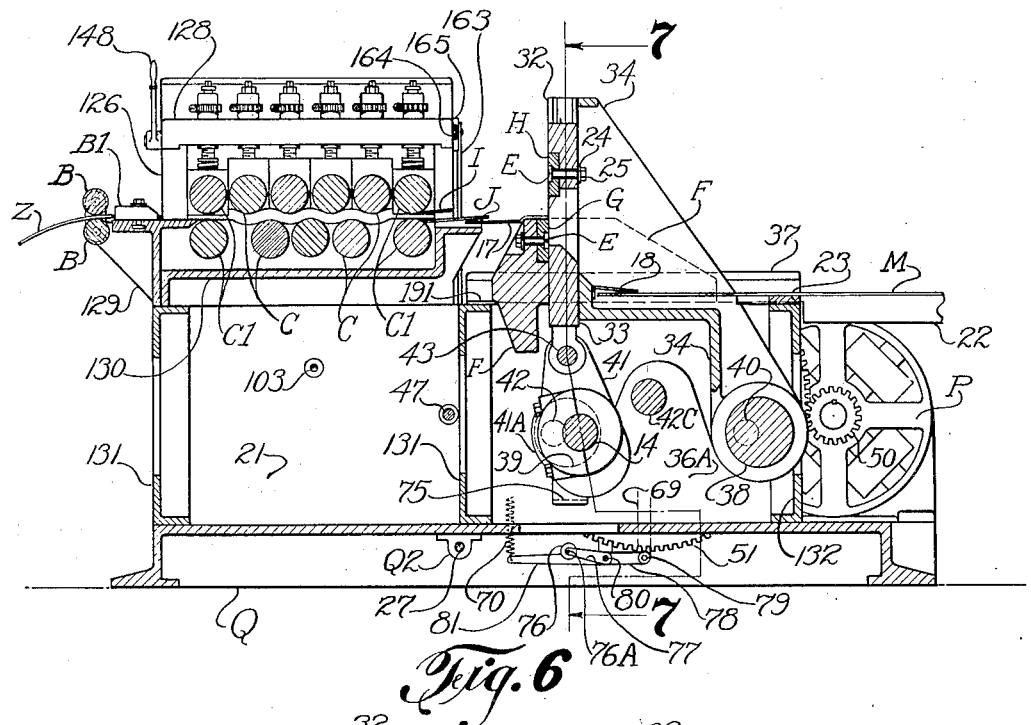
Figure 7:
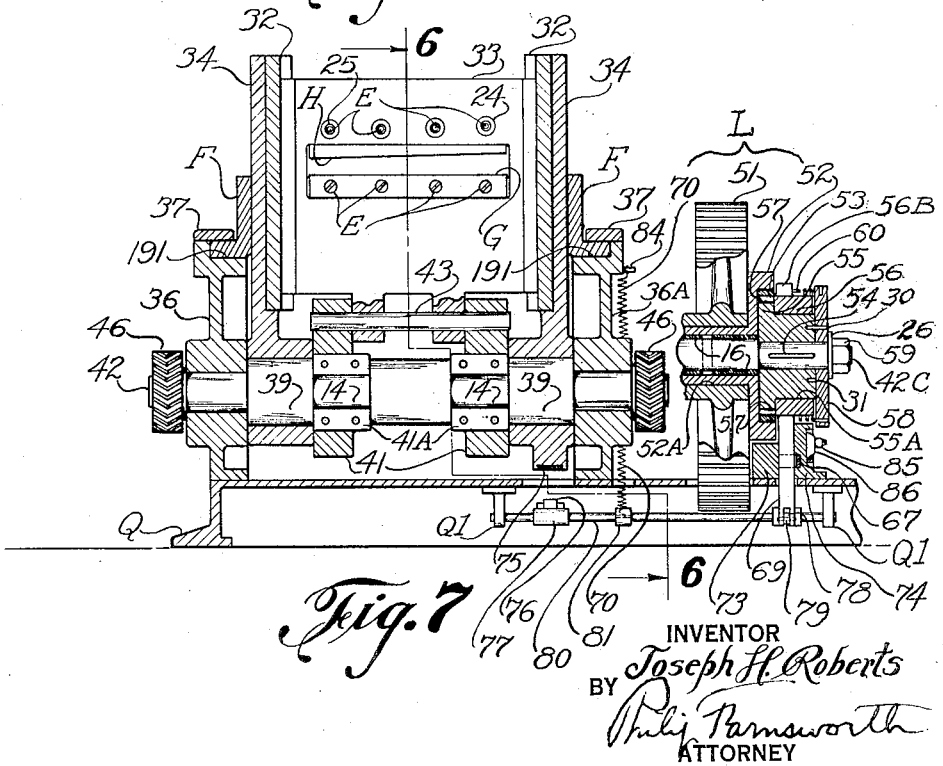
Figure 16:
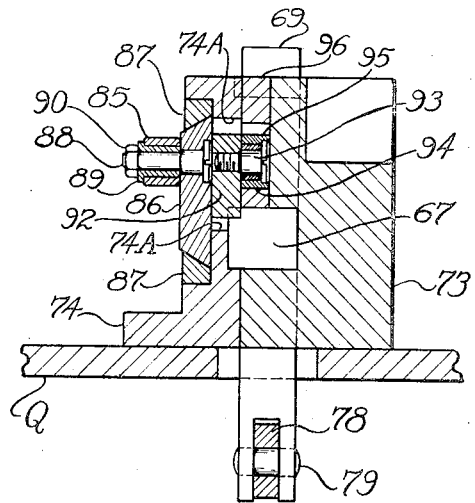
Figure 17:
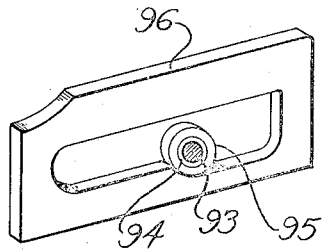
Figure 15:
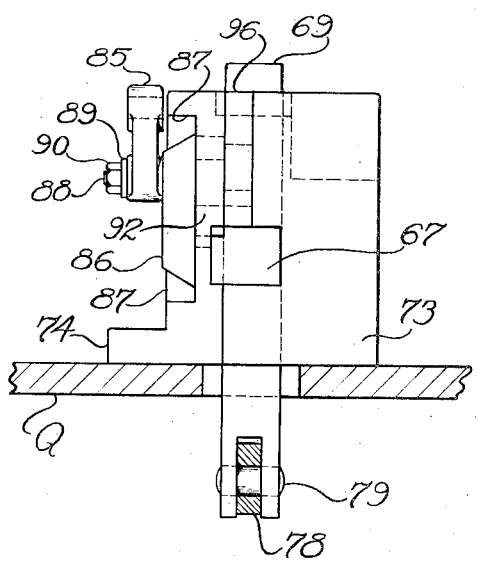
Figure 18:
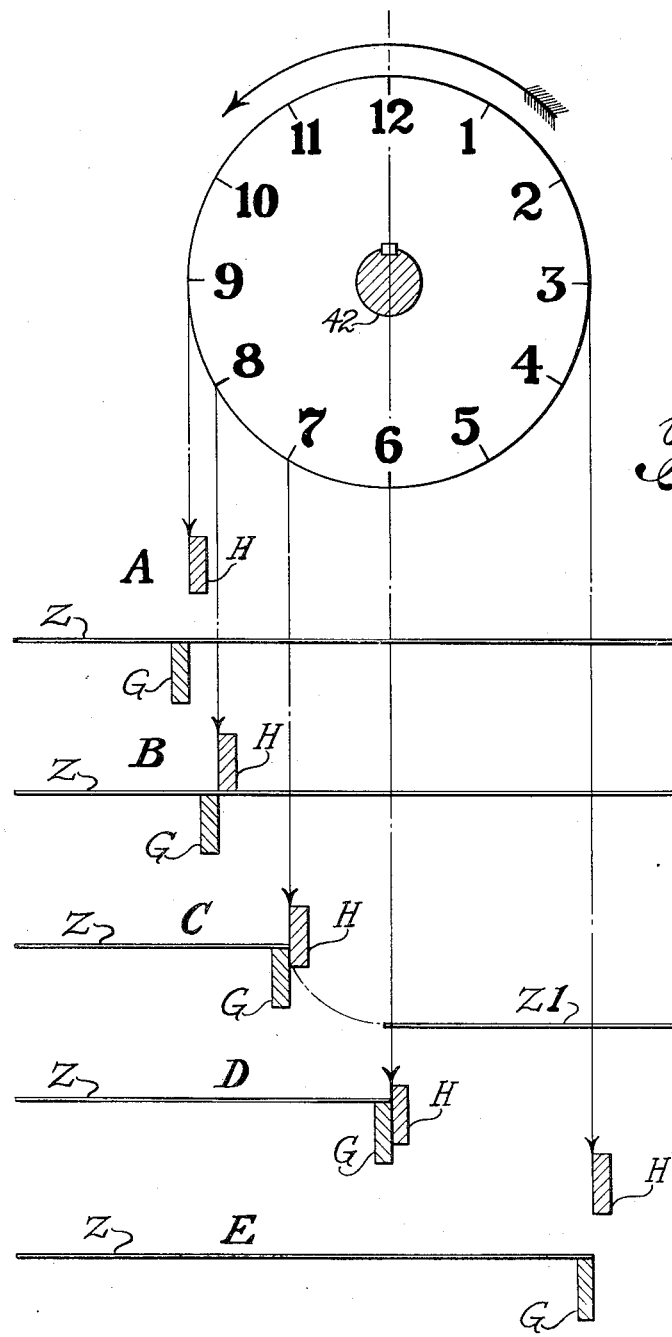

The invention consists of the structural improvements and combinations pointed out in the claims and disclosed by way of example in the drawings which comprise various views of one machine including Fig. 1 which is a front side elevation viewed from the operator's side, showing the operator's controls, the stock Z being fed from left to right;

Fig. 2 a plan of the machine with ends reversed from Fig. 1;

Fig. 3 a transverse vertical section on line 3—3 of Fig. 2, and end elevation looking from left to right, Fig. 2 (i. e., from right to left, Fig. 1);

Fig. 4 a left end elevation of the machine as in Fig. 1;

Fig. 5 a rear elevation (rear of Fig. 1);

Fig. 6 a longitudinal vertical section on line 6—6 of Figs. 2 and 7, and side elevation looking as in Fig. 1 from front to rear;

Fig. 7 a transverse vertical section on line 7—7 of Figs. 2 and 6, and end elevation looking from right to left of Fig. 1;

Fig. 8 a plan of the left portion (Fig. 1) of the machine, showing the strip-feeding rolls of the roll-stand;

Fig. 9 a front elevation of said roll-stand enlarged from Fig. 1 and showing further details as in Fig. 8;

Fig. 10 a left end elevation of the roll-stand of Figs. 8—9 and driving means and the gear-housings therefor;

Fig. 11 an enlarged section at 11—11, Fig. 8 showing the roll-adjustment of the roll-stand of Figs. 8–10;

Fig. 12 a detail perspective of wedge 144 of Figs. 9 and 11;

Fig. 13 a front elevation of clutch-tripping mechanism and re-latching mechanism for the clutch, viewed facing Fig. 5, i. e., from the rear of Fig. 1;

Fig. 14 a plan of the tripping mechanism shown in Fig. 13;

Fig. 15 an end elevation of Fig. 13 viewed from right;

Fig. 16 a sectional elevation of Figs. 13—14 on line 16—16 thereof;

Fig. 17 a detail perspective of cam 96 of the clutch-tripping latch;

Fig. 18 a diagrammatic showing of the cycle of operations of the shearing blades G—H.

Figure 26:
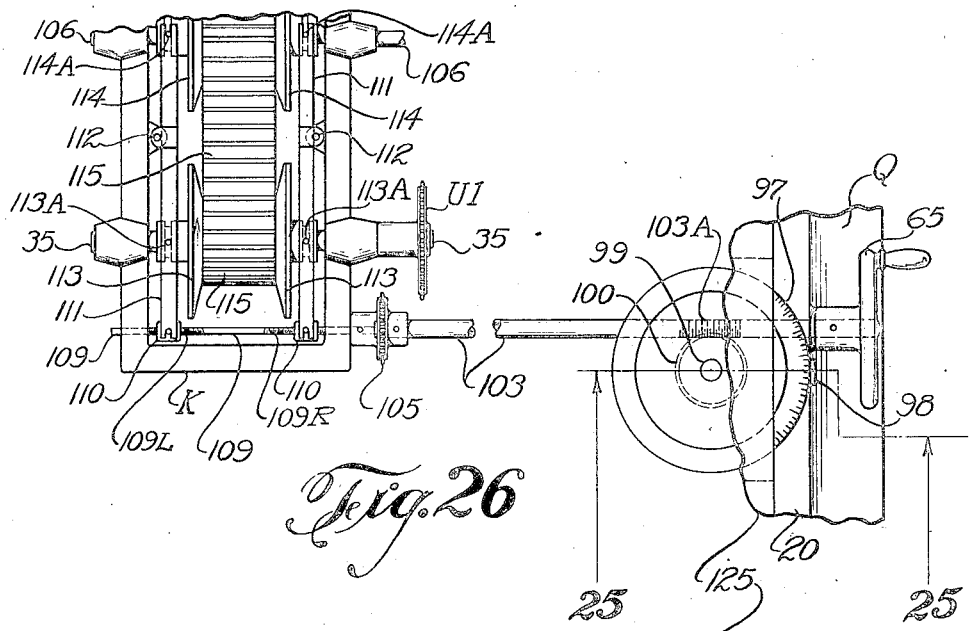
Figure 25:
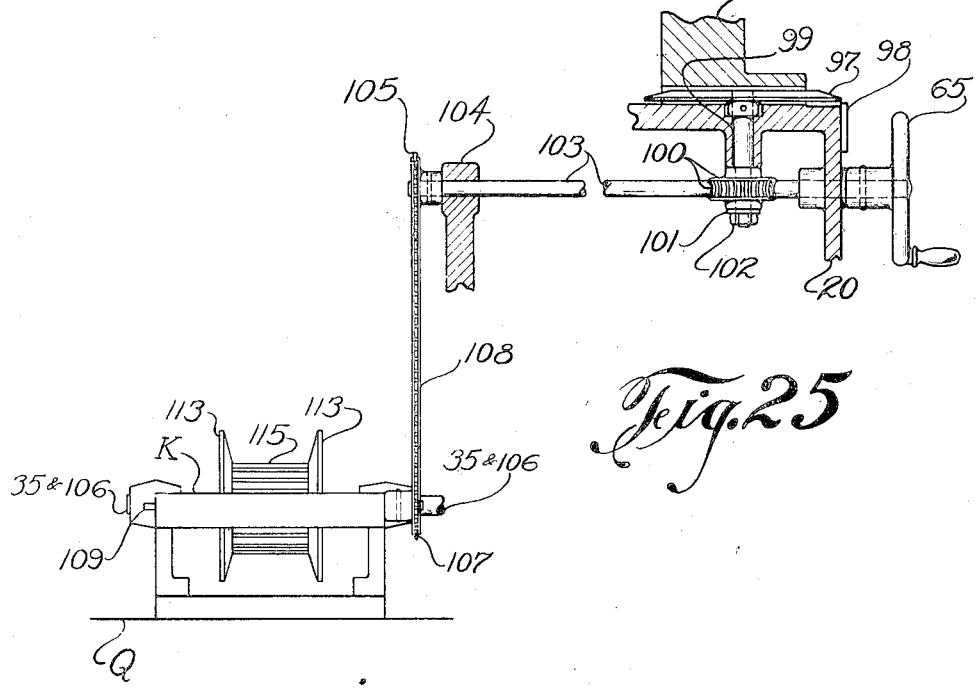

Figs. 19-24 show the manual control for the clutch-tripping mechanism, which is provided in inter-connected relation with the automatic control thereof;

Fig. 19 being an enlarged sectional view on line 19—19 of Fig. 1 looking from right to left; this Fig. 19 showing at the right the connections of the manual tripping control Y with the automatic tripping control K;

Fig. 20 being a left end elevation of Fig. 19 (front of Fig. 1) showing the handle control and indicating dial;

Fig. 21 being a perspective of the positive-locking clutch 49 of Fig. 19;

Fig. 22 an enlarged sectional elevation on line 22—22 of Fig. 24 illustrating the action of quick-acting clutch 186 of Fig. 19;

Fig. 23 an end elevation of said quick-acting clutch 186;

Fig. 24 a section of said quick-acting clutch on line 24—24 of Figs. 19 and 23; and Figs. 25—26 being details of the automatic control K of the tripping mechanism;

Fig. 25 being a sectional elevation on line 25—25 of Figs. 1 and 26, and

Fig. 26 a plan of said automatic control mechanism.

In the exemplary machine disclosed, the general construction and operation are as follows. The long metal sheet or strip of sheet steel Z, Fig. 1, constituting the stock to be fabricated, usually comes in coils, the strip in each coil being several hundred feet long more or less, weighing at least several hundred pounds more or less, and being of various widths up to several feet, and frequently of substantial thickness, and usually requiring considerable power to shear it. The operator places one of these coils of long strip Z on the reel A, Fig. 1 at left; or the stock need not be coiled but may come directly from other manufacturing steps to the operations of a machine embodying any features of the present invention. The sheet stock which the exemplary machine is designed to fabricate includes stock generally known as "strip steel", being sheets of a width up to fifty inches more or less and of a thickness from about twenty U. S. standard gage (0.0375 inch) up to one-half inch thick requiring a machine of sturdy and powerful construction.

The various parts of the machine are arranged on or about the main frame or bed Q.

In operation, a workman inserts the free outer or "crop" end of the coiled sheet-stock Z (Fig. 1 left) thru guide-rolls B and strip-edge-guides B 1 (Fig. 2 right). He then pushes strip Z forward (Fig. 1, rightward) to an engaging position between a pair of pinch feed-rolls C 1 (left, Fig. 1, and Fig. 8, showing the great length of the rolls for the width of the strip steel). These pinch-rolls grip strip Z and are power-operated to feed it continuously rightward. They are coordinated with the driving mechanism of the adjacent shear to the right in a manner to be described.

The machine may be running while a workman thus starts the end of a long strip moving from left to right thru the machine. The first pair of feed-rolls C 1, C 1 feeds strip Z to the rest of the roll-stand just to the right, which comprises the remaining rolls i. e., staggered feeding and straightening rolls C, and the second and last pair of pinch-feed rolls C 1, C 1. The feeding and straightening-rolls C (which are not pinch-rolls like C 1, C1 but are staggered with respect to one another) participate in feeding strip Z, because of their contacts with the latter in its unstraightened condition.

There are three principal functioning elements in the exemplary machine, Fig. 1, i. e., (1) the reel support A, (2) the stationary roll-stand at left (Fig. 1) containing the roll mechanism for feeding and straightening the long strip Z, and (3) the reciprocating shearing or fabricating mechanism adjacent the roll-stand at the right and to which the strip Z is fed directly by the right-hand pair of pinch-feed rolls C 1—C 1.

The fabricating mechanism such as the strip-shearing means includes blades G, H shown cross-hatched near the middle of Fig. 1. While the strip straightened by rolls C is being fed across the short distance between the right-hand feed-rolls C 1—C 1 and said shearing mechanism adjacent said right-hand rolls, the van of said strip is kept straight and prevented from being carried around either of said last pair of rolls C 1—C 1, by means of horizontal brass guide-plates I and J (Figs. 1, 5, 6, 8 and 9) located between rolls C 1—C 1 and fabricating tools G—H. Those guides I and J (Fig. 6) also guide the remainder of the length of the fed strip in its horizontal passage over horizontally-reciprocating shear-blade G (vertically fixed) and below blade H (moved vertically for the shearing operation); and said guides I and J also guide the van of strip Z (yet a part of the coil in reel-support A) in its travel further rightward to horizontal work-apron 17 and thence to the top of a receiving table M and on top of short previously sheared strips remaining on said table M. The free front (right) end edge of guide-plate J horizontally extends (Fig. 6) over the free rear end edge of work-apron 17, the opposite ends of J and 17 being secured to the frame members respectively of the roll-stand at left and the shear-stand at right. The edges of the rear portion of guide-plate I are secured in suitable grooves milled in the sides of the vertical side-frames 125—126 of the roll-stand. Apron 17 guides strip Z over the tops of vertically fixed shear-blade G and of support F for G, and above table M beyond them.

The successive linear portions of the long metal strip Z from reel-stand A are guided mechanically to the shearing operation by I, J and 17 and are pushed rightward between the shearing tools G, H finally by the tractive contact of rear portions of the strip with the right-hand pair of pinch-rolls C 1, C 1 (and right-hand units of feeding and straightening rolls C), and pass underneath blade H (Figs. 1 and 6).

Shearing blades G, H are carried in a shear-stand 34 (Figs. 1, 6 and 7) which normally is at rest but which in the exemplary machine after regular intervals is reciprocated a short distance leftward to and rightward from the roll-stand at left; the work-apron 17 reciprocating beneath the overlapping end of guide-plate J. At a certain point of the continuous rightward strip-feed the normally stationary shearing members G, H commence their common leftward horizontal movement (opposite to direction of strip-feed), of a complete short horizontal excursion (very short relative to its distance between successive points of stock fabrication) from and back to their normal condition of rest at right in the positions shown, H above G, Figs. 1 and 6. During the leftward (rearward) horizontal movement of the entire shear-stand 34, the blade H is elevated further above its normal position above blade G, Fig. 1 (as in a guillotine) in preparation for its subsequent downward shearing hammer blow effected by a positive forceful downward mechanical drive of heavy blade H, to be described, the parts driving blade H having sufficient mass and momentum to fabricate the heavy steel strip; the forceful striking of the strip by blade H (alongside blade G) in its said downward movement occurring at a certain instant during the horizontal rightward return of shear-stand 34 (in the direction of strip-feed) and both blades G and H then passing shortly to their normal positions of rest at right shown in Fig. 1. Said downward movement of H occurs after a desired length of strip Z (automatically effected according to manual adjustment) has been fed from the right-hand pair of rolls C 1, C 1 rightward onto table M. Blade H is forced downward positively by the comparatively heavy fly-wheel gear 51, Figs. 1—2 (while the shearing mechanism G, H is returning rightward with the stock) so that thereupon a short sub-length from the forward portion of the moving long strip Z supported on table M is sheared off between blades G and H, such short sub-length then resting on table M as a completed product of the machine here shown, and separated from the uncut long length at left which then continues to be fed beyond G and H to table M in preparation for the next shearing operation. Thereupon blades G and H complete their horizontal excursion by moving further rightward to their normal positions of rest (in Fig. 1) where, while a fresh uncut portion of long strip Z is being fed rightward from reel-stand A at left to positions over table M at right, said blades await the next operation of their driving mechanism to repeat their shearing cycle with reference to the moving strip.

Roll-stand

The construction and operation of the details of the roll-stand including all the rolls C, C 1 are shown clearly in the drawings, more particularly in detail in Figs. 8–12.

The roll-stand is fixed on machine frame 20 (Fig. 1) and is located to cooperate between reel-stand A at its left and reciprocatory shear stand F at its right. The rolls (especially left-hand pair C 1, C 1) pull and unwind strip Z from the coil on the reel, push and pull the strip thru the roll stand, (especially right-hand pair C 1, C 1), and push it between blades G, H and over receiving table M.

Each of the rolls extends horizontally from front to rear (Figs. 1, 2) and all are journaled in bronze bushings 19 (Fig. 11) in and within the frame of the roll-stand including vertical front and rear members 125—126 (Figs. 1, 4 and 11), left and right end members 131—132, and two caps 127—128 (Figs. 1, 2 and 11) above the rolls; also a bottom tie (Figs. 1 and 9).

All the rolls are rotated by power from common motor P (Fig. 2) via fly-wheel-gear 51 by which also the shearing mechanism is operated in coordination with the strip-feed by the rolls for any desired adjustment of the length of cut sub-length of strip. The power is applied to the rolls (Fig. 10) by gears in a gear-housing 155—156 with cover 157 (Fig. 2), the housing being supported on bracket 158 (Figs. 10 and 4). All the rolls C and C 1 are rotated on their fixed axes by double universal joints 150 (Figs. 2 and 10) which permit vertical roll-adjustment, Fig. 11. The nest of intermeshing gears in housing 155 (Fig. 10) on the ends of the universal-joint shafts are driven by gear 169 on drive shaft 172 (Figs. 10 and 2) turned by gear 167 (Fig. 2) driven by spur gear D fixed to the driven member of friction clutch 159 the driving member of which is turned by shaft S driven by reduction gearing in casing R in turn driven by shaft X driven by pinion W meshing with the fly-wheel gear 51 which also operates the shearing mechanism including blades G, H.

There are two pairs of pinch-rolls C 1 for the principal feeding of strip Z. In each pair the strip is pinched and tightly gripped between the upper and lower rolls for feeding. The first pair (left, Figs. 1 and 10—11) pulls the strip from its coil on the reel on stand A to and thru guide-rolls B, (Fig. 8) and between the strip-edge-guides B 1, and pushes it toward the second pair of feed rolls C 1 (at right of the entire group of rolls) and to the intervening staggered and spaced-apart feeding and straightening rolls C. The second or right-hand pair of pinch-rolls C 1, C 1 receives strip Z from the power driven rolls C and pushes it between adjacent guides I, J, over apron 17, and between blades G, H (Fig. 1) onto table M. The upper and lower rolls C in the group between the two pairs of pinch-rolls C 1, C 1 are spaced apart from one another for the straightening operation during feeding by the same rolls; and these rolls C cooperate with the strip-feed by pinch-rolls C 1.

All five lower rolls C 1, C are arranged with their axes fixed in the same horizontal plane.

Upper rolls C 1 are journaled in boxes 133 (Figs. 9 and 11), the boxes being adjustable vertically. The faces of these top pinch-rolls C 1 are kept from actual contact with the faces of their mates C 1 below them, by adjusting wedges 144 (Figs. 12—11). These wedges engage beneath the boxes 133 (which have inclined surfaces to receive the wedges) and thus support the boxes. Screws 120 provide for horizontal adjustment of the wedges and consequent regulation of the small spaces between upper and lower feed-rolls C 1. These spaces are less than the thickness of strip Z but are sufficient to facilitate entrance of the front edge of the strip to a line between upper and lower rolls C 1, C 1 where it is gripped for feeding. As the steel strip is drawn by a roll-pair C 1, C 1 into said small space between them, the strip slightly raises roll-box 133 (Fig. 11) against helical spring 137 held between said roll-box and adjusting-screw 136 therefor. Spring 137 in operative position always is under compression stress (between wedge 144 and spring-cap 138) and prevents the upper feed-roll C 1 from being moved so far upward by the strip as to relax the desired tractive feeding grip of the two rolls on the strip between them. Cap 138 is interposed between the spring and its adjusting-screw 136. These parts are duplicated at the opposite ends of each upper roll C 1. The springs 137, acting individually and in a pair for left-hand upper roll C 1 permit passage between the rolls of the unstraightened strip from reel-stand A, without relaxing the feeding-grip of the rolls on the strip. In setting up the machine to operate on a strip of given thickness, the wedges 144 are adjusted by horizontal screws 120; and the roll-boxes 133 with their springs 137 are adjusted by vertical screws 136. All this construction is provided for each end of both the left-hand and right-hand pairs of pinch-feed-rolls C 1, C 1, Fig. 1. Each upper feed-roll C 1 can be and is individually adjusted vertically (and independently of the feeding and straightening rolls C) by rotation of the internally threaded nut-members 139 which thereby vertically move adjusting-screws 136 which are prevented from rotating (and thereby given a fixed end bearing on spring-cap 138) by parallel bars 142 connecting the two adjusting-screws 136 of the left-hand and right-hand upper pinch-rolls C 1. Both ends of either one of rolls C 1 thus can be adjusted simultaneously via its two vertically adjustable journal-boxes 133, by means of the respective worm-shafts 141 (Figs. 10—11) which at their ends are formed with worms which mesh with worm-gears 140 fixed on the tops of nut-members 139. Each shaft 141 independently can be turned manually by a suitable crank-wrench engaging a milled square end of the shaft, as at upper right, Fig. 10, i. e., at the front of the machine, Fig. 1, facing the operator. (Shafts 141 are journaled, Fig. 10, in vertical webs 189—190 which project up from roll-stand caps 127—128; the shafts being held from axial movement by collars 143). Said individual adjustment of each spring 137 via shafts 141 provides for obtaining the desired tractive grip on strip Z by feed-rolls C 1, when the machine is being set up for work on a strip of given thickness. Then the wedges 144 are adjusted by horizontal screws 120 so as to hold upper feed-roll C 1 high enough up to facilitate entrance of the strip beneath it and above lower roll C 1, altho not so high as to prevent proper freedom of action of springs 137 sufficient to maintain the desired tractive grip on the strip obtained by adjustment of vertical screws 136 appropriate for a strip of given thickness. The end portions of shafts 141 and the stop-collars 143 (Fig. 10) may be marked with dial and index to indicate the conditions of adjustment of the upper rolls C 1 relative to the lower rolls C 1.

Additional mechanism is provided for vertically moving both the upper pinch-rolls C 1 (at left and at right) at the same time, for the purpose of releasing strip Z from the feeding-grip (and if desired withdrawing it from between the pinch-rolls C 1) without altering the relative adjustment of the two pairs of rolls C 1, as at times when the machine may be caused to be stopped in the midst of its operation on a strip, or for inspection. First, the operator connects together the two shafts 141 of the two upper feed-rolls C 1 by operating the handle 148 (Fig. 1) i. e., (end view Fig. 10) turning it anti-clockwise. Then he can raise both upper rolls C 1 simultaneously by operating a crank-wrench applied to the squared front end of either one of shafts 141. Similarly the rolls can be depressed simultaneously by said wrench operation; and after depression they will have the same relative adjustment as before raising. This arrangement is particularly useful because by the same means not only the two top pinch-rolls C 1 but also all the four upper feeding and straightening rolls C are connected together and raised simultaneously, and later depressed simultaneously to restore them to their operating positions preparatory to re-starting the machine, all as shown, Figs. 10–11. Then handle 148 can be returned to its normal position operating clutches 145 to disconnect 141 as a group from common shaft 152 and restore the isolation of shafts 141 from one another by which isolation each of all the upper rolls C, C 1 then is adjustable individually at its two ends.

The mechanism by which handle 148 connects together all six roll-adjustment shafts 141 is as follows. Said handle is fixed on a clutch-operating rock-shaft 147 (Fig. 10) journaled in a gear-casing 153 having coverplate 154. The six shafts 141 are extended rearwardly (left, Fig. 10) to project into gear-casing 153, and on their ends inside 153 are mounted friction clutches 145. When shaft 147 is turned by handle 148 then all the six roll-adjustment worm-shafts 141 are connected together via a common shaft 152 (Figs. 10 and 8) to which they all are coupled by clutches 145, so that when any one shaft 141 is wrench-turned manually as above, then all the other five duplicates of 141 are turned thereby via 152. To effect the connecting together of shafts 141 via common shaft 152, clutches 145 secured to the ends of 141 have extending quill-hubs 145 A carrying bevel gears 149 (Figs. 8, 10) which mesh with bevel gears 151 on common shaft 152. Rock-shaft 147 for handle 148 is a pivot shaft for yokes 146 which operates clutches 145. The above gears and clutches and common shaft 152 all are mounted inside the oil-tight and dust-proof casing 153.

The four upper feeding and straightening rolls C (horizontally between the two left and right upper pinch-rolls C 1, Fig. 1) are journaled for power rotation in vertically adjustable boxes 134 (Fig. 11) similar to the journal-boxes 133 alongside 134 for pinch-rolls C 1 (a box for each end of each roll); and rolls C are provided with adjusting screws 135 similar to screws 136 for pinch-rolls C 1. But in the case of these feeding and straightening rolls C, the worm-gears 140 turned by worm-shafts 141 (to adjust the two ends of each roll C) may be and are mounted directly on the upper ends of adjusting screws 135 because here (differing from the arrangement for rolls C 1) no springs are interposed between the journal-boxes 134 and the adjusting screws 135 but the latter engage directly in said boxes and therefor the screws themselves can be and are turned instead of turning nuts 139 for feed-rolls C 1; rolls C being suspended from screws 135 instead of resting on wedges as do rolls C 1. Thus feeding and straightening rolls C are given a rigid set (or operating position) as distinguished from the partially yielding set for pinch-rolls C 1 via above springs 137.

With the above construction all the six upper rolls C, C 1 can be adjusted with respect to the five lower rolls C, C 1 either individually or collectively as a single group, at the will of the operator.

The four upper feeding and straightening rolls C are set properly with respect to strip Z by the above vertical adjustment of said rolls. Also the three lower rolls C are staggered with respect to the four upper rolls C are shown (Figs. 1, 6 and 9). The vertically adjusted relations of upper rolls C for the feeding and straightening operation between upper and lower rolls C is termed the "roll-set". The van of strip Z as it leaves reel stand A and enters the first pair of pinch-rolls C 1 may be variously malformed as the result of bad handling or of the mill-operations of producing it including cold-rolling and longitudinal slitting to desired width, and including the curvature of its coiled form which might result in sheared sub-lengths of different lengths even when as in the machine hereof the shearing operations are co-ordinated with the rate of strip-feed. Such malformations (especially that of the coil curvature) are straightened or ironed out by the staggered rolls C during strip feeding by them in preparation for shearing the strip into relatively short lengths of desired equal linear dimensions. This straightening of the coil-curvature involves a re-deformation and metallic re-setting of the steel and is termed "breaking the back" of the strip. As illustrated in Fig. 1, the convex surface of curved strip Z is caused to face upwardly in its passage to the roll-stand, as is preferable. To effect such re-setting into straightened condition the above construction not only involves the staggering of the upper feed rolls C relative to the lower feed rolls C but the described vertical adjustment of upper rolls C which with their said staggered relation to lower rolls C permits them (upper rolls C) to be set below a straight horizontal path between the small space between the two left-hand pinch-rolls C 1, C 1 and the small space between the two right-hand rolls C 1. Thus the first top roll C (left-hand top feed roll C, Fig. 1) is adjusted, Fig. 9, down below top left-hand pinch roll C 1 toward the space between lower staggered feed rolls C 1, C. All the five lower feed rolls C 1, C are arranged in the same horizontal plane. The two upper pinch-rolls C 1 in practice are adjusted down to the same extent as one another as determined by the thickness of strip Z so that their axes and lower surfaces lie respectively in the same planes. But the top feed rolls C are adjusted (down toward the spaces between successive staggered lower feed rolls C, C 1) so that altho the first upper feed roll C (left) may extend below left top roll C 1 a distance which is three or four times the thickness of the strip Z yet the next top roll C to the right is higher than the first and so more nearly up to the like level of the two top rolls C 1; and each successive top roll C (left to right) is higher than the one at its left (i. e., more nearly up to the level of top rolls C 1) until finally the last top roll C (at right) is at more or less the same level as top rolls C 1, C 1. These adjusted positions of top feed rolls C (termed the "roll-set") depend on the temper and springiness of the metal of the strip, and these top rolls C are depressed below the level of rolls C 1 to such extent as to cause the strip to be bent beyond its elastic limit during its feed by and between upper and lower rolls C. Thus the strip Z, pushed from left-hand pinch-rolls C 1, C 1 to the power-driven rolls C, and fed by the latter, is bent downward most sharply under the bottom of first or left top roll C; it then is pulled and pushed up over the top of first or left bottom roll C, and then is bent downward under the bottom of second top roll C to right a little less sharply, etc., so that the trip is forced to travel in waves of gradually decreasing amplitude toward the right until finally as it emerges from between the second vertical pair of pinch-rolls C 1 the strip is reset physically and metallically in commercial or substantially level or straightened condition proper to be fed by said pinch-rolls, directly to the shearing mechanism in order to cooperate with the latter in producing cut strip sub-length of equal lengths.

As suggested above, the feeding mechanism of the roll-stand including primarily the pinch-rolls C 1 but including also the straightening rolls C which aid in feeding the strip, is driven by the same motor P and fly-wheel-gear 51 which operate the shearing mechanism, so that the feed and the shear are co-ordinated; and furthermore such coordination is maintained for various adjustments of the shearing mechanism to cut the long strips into uniform lengths which for different adjustments have different linear dimensions, as will be described; but such coordination of the shearing mechanism is effected with respect to a rate of feed of uncurved strip, i. e., at rate of operation of straightening feed-rolls which causes them to deliver to the shearing mechanism a product of uncurved strip at the desired rate to which the intermittent shearing operations are coordinated, as distinguished from the coordination of the shearing operations to a rate of operation of non-straightening feed-rolls which would pull the strip equally fast from roll-stand A but would result in lengths of material of curved strip which would be actually longer than the intent and design of the adjustments of the shearing mechanism for sheared sub-lengths of different lengths corresponding to such adjustments.

*Shearing relations to feeding mechanism*

Hence another important feature of the present invention in addition to the general combination of elements is the construction of the shearing mechanism and the arrangement of its controls and power connections with respect to the feeding mechanism, (the whole constituting uniformity-mechanism), by which the portions of the strip Z which are cut successively from its successive forward ends are caused to be of uniform length, this result being due to the timing of the operations of the shearing mechanism in coordination with the rate of continuous feeding motion of the strip imparted by the rolls C and C 1.

This uniformity-mechanism includes a master and slave, each illustrated as combinations of mechanical elements.

The slave includes (for example) a roll-locking or uniformly acting clutch L (Figs. 2, 5 and 13) preferably of special design which together with associated mechanism does the work of operating the shearing members or blades G, H to move them into positions to shear, and to do the heavier work of moving H downwardly actually to shear, the more or less thick metal strip.

The master (for example) is a variable (adjustable) speed transmission K (Figs. 2, 4, 5, 19, 25 and 26) which is adjustable by the operator by hand-wheel 65 (turning graduated dial 97) for a given job of desired length of cut sub-lengths. This master trips slave (clutch) L and connects it to operate the fabricating members at the time proper to insure the shearing or other fabrication at portions of the long strip at locations uniformly distant from one another; the construction of slave L furthermore being such that it always acts uniformly, i. e., the same time always elapses (at a given operator's adjustment by the scale of dial 97 for a given job) between the instant when slave L is tripped by master K and the instant when L forces down shearing-blade H by the action of heavy flywheel 51 actually to shear the strip; the master K is so constructed and adjusted and coordinated with the feed of the strip that at a given adjustment it always trips slave L at the instant when the same length of (straightened) strip as before has passed rightward beyond guides I, J and blade H in preparation for shearing, to cause blades G and H to produce successive cut sub-lengths of the strip which have the same linear dimension. Thus master K in effect is a strip-length measuring apparatus which lays out and directs the work to be done by slave L. The latter, its fly-wheel drive 51 and the reciprocating shear parts between L and blades G, H possess ample mass for heavy duty involving the hammer blow of blade H down on and across the long strip of considerable width.

The construction and operation of the mechanism by which blades G and H are actuated by slave-clutch L when the latter is tripped by master K, are as follows, this construction including what is termed the aerial traveling shear, Figs. 1-3, 6-7.

Clutch L is a half-revolution clutch in the particular design shown, and it rotates its shaft 42 C when tripped by master K, for then said shaft is clutched to constantly-rotating heavy fly-wheel gear 51. To said clutch-shaft 42 C are keyed herring-bone gears 45 which mesh with herring-bone gear 44 on shaft 40 and with herring-bone gear 46 on shaft 42; the driven gears 44 and 46 being duplicates, so that shear-shafts 40, 42 are rotated at the same rate. The first above described horizontal excursion of both blades G, H and the simultaneous vertical excursion of H are obtained via said shear-shafts 40, 42 by means of the following eccentric construction. The members which carry blades G, H are operated by eccentrically fabricated integral portions of said shaft 42 or its equivalent to be described. The shear-carrying members are (1) the horizontally moving carrier F in which blade G is fixed, and (2) the vertically moving carrier 33 in which blade H is fixed.

Carrier F for blade G is a horizontally reciprocable frame slidable longitudinally of the machine in line with the strip-feed caused by the coordinated simultaneously feeding and straightening mechanism of the roll-stand. Carrier F slides, Fig. 7 along ways 191 cut in frames 36, 36A and held by gibs 37. This carrier F is reciprocated horizontally by means of actuator 34 which is a frame which freely extends vertically thru frame F to slide up and down eccentrically, and by such eccentricity to reciprocate F horizontally. Actuator 34 is given such nutating movement by means of the journaling of its lower portion on four eccentric portions 38, 39 of shear-shafts 40, 42. Said four eccentric portions are fabricated integrally with said shafts and include two eccentrics 38 on shaft 40 and two eccentrics 39 on shaft 42. Thus actuator 34 is given not only a vertical motion thru blade-G-carrier F but also a horizontal movement which moves F horizontally on its ways 191, so that F and its blade G (which is not moved vertically) are given horizontal reciprocation in line with the strip-feed.

Vertically movable blade H participates in the above horizontal excursion of blade G by reason of the mounting of H in carrier 33 (shear-gate); for carrier 33 is arranged for vertical reciprocation in actuator 34 (the producer of horizontal movements of G and H) in analogy to the relation of 34 to F. The result is that the vertical component of the eccentric nutation of actuator 34 moves carrier 33 and its blade H vertically, just as the horizontal component of the same actuator 34 moves carrier F and its blade G horizontally.

Actuator 34 is held in mechanical contact with blade-G-carrier F by two wedge-shaped gibs 10 (Fig. 1) adjusted by two screws 11.

Blade H is quite long in accord with the considerable width of the long strip to be sheared and is so fixed in its carrier 33 that its lower edge is set at a sufficient angle with the horizontal (Fig. 7) that it will act progressively on the considerable width of the wide strip from one side edge of said strip to the other, in simulation of the common small hand shear for cutting cloth or paper. Thus, in Fig. 7, as long blade H is forced downward as a whole toward blade G, the left end of H first reaching G engages one edge of the strip at the front (operator's side) of the machine, and then in a wide stroke the successive portions of blade H progressively reaching G gradually act transversely of the width of the long strip until finally the right or rear end of blade H reaching G completes the shear-cut thru the opposite side edge of the strip at the right, i. e., the rear of the machine.

For the purpose of effecting such relatively long vertical stroke of blade H as compared with its horizontal stroke, its carrier 33 may be given a sufficiently long vertical stroke (six inches more or less) by making carrier 33 independent (equivalent means may be employed) of the vertical component of the movement of nutating actuator 34 which causes the very short horizontal movement of G and H (three inches more or less). That is, the vertical component of the motion of H may be double its horizontal component.

For this purpose the left-hand shaft 42 (Fig. 6) of the two shafts 42, 40 which operate the nutating actuator 34, is formed (Figs. 6—7) with a pair of eccentrics 14 (additional to above eccentrics 38—39) and these eccentrics 14 vertically reciprocate the carrier 33 and its blade H independently of the vertical component of actuator 34; altho 34 is utilized (additionally to its function of horizontally reciprocating both blades G and H) as a lateral support for carrier 33, by providing vertical ways 32 on the inside of frame 34 on which 33 slides up and down. Shaft 42 alone (Fig. 6) of the two shear-shafts 42, 40, actuates carrier 33 vertically and therefore shaft 42 alone is provided with eccentrics 14.

The operating mechanism connected between the two eccentrics 14 on the one hand and blade-H-carrier 33 on the other, includes two pitmen 41 journaled (with their caps 41A) on eccentrics 14 of shaft 42; the upper end of pitmen 41 being journaled to pivot-shaft 43 (Figs. 6—7) carried in lugs pendant from 33 lying alongside pitmen 41. Thus blade H (Fig. 7) by the operation of sheer-shaft 42, eccentrics 14, pitmen 41 and carrier 33 is given sufficent amplitude of vertical travel (six inches in the exemplary machine) to discount the above described transverse inclination of its cutting edge from the plane of the strip Z, by providing a vertical stroke for blade H which is ample to shear strip Z completely from edge to edge transversely during a portion of the short time of the short horizontal travel (three inches) of the same blade H (with its vertically-stationary mate G) by the operation of the same shaft 42, and of the other eccentrics 38, 39 on said shaft, and of the nutating actuator 34; said horizontal travel of H being simultaneous with its said vertical stroke.

Fig. 6 shows the normal stationary positions of the above six parts, i. e., with all the above eccentrics (two each of 14, 38 and 39) at three o'clock relative to (extending horizontally rightward from) shear-shafts 40 and 42, and with blade H at a somewhat higher level than G allowing strip Z to be pushed between the blades. As clutch-shaft 42 C starts turning clockwise (Fig. 6) as the result of the tripping of slave L by master K, the clutch-shafts and eccentrics driven thereby rotate anti-clockwise. The first result of this is to move blade H (via carrier 33) yet higher above G than in Fig. 6, as a preliminary to the six-inch downward shearing movement of H; and during such preliminary movement of the blade G (via carrier F) it is moved (leftward) opposite to the direction of continuous uniform feed of sheet Z. Thus far, blade H has been raised to its highest point, and all the six eccentrics (38, 39, 14) have revolved anti-clockwise thru a quarter circle as illustrated (from three to twelve o'clock) in the upper or dial diagram of Fig. 18, of which the center of the clock-dial represents shear-shaft 42; the blade diagrams A—E below the dial indicating the positions of blades G and H relative to one another and to shaft 42 at various stages of the single complete rotation of shaft 42 which effects each of the intermittent excursions of the blades between their periods of rest while sheet Z is fed continuously without the stoppage of prior strip-shearing machines for the purpose of permitting shearing by a shear in such case not horizontally movable. For example, in the present invention, after the first quadrant operation, as described above (from three to twelve o'clock) the operation of the second quadrant (from twelve to nine o'clock) includes the continued leftward horizontal movement of both G and H (to execute the second half of their three-inch horizontal leftward travel) and includes the first half of the six-inch downward movement of H toward the steel strip to be sheared, said operation of the second quadrant ending at nine o'clock with the blade-positions shown at diagram A, Fig. 18, when H is at its normal level higher than G (same as at its position of rest at three o'clock and lower than at twelve o'clock) and with G and H at their extreme leftward positions which are most remote (three inches) from their normal position at right at three o'clock. (The vertical lines pendant from the dial-numbers in Fig. 18, and the blade-position-diagrams A, etc., at the lower ends of said pendant lines indicate the various joint and several positions of the blades in the different stages of their horizontal movement; and the horizontal distances between said pendant lines indicate the rate of the horizontal movements of the blades). In diagram A the blades are about to commence the three-inch return (rightward) trip to three o'clock of three left and right horizontal excursion therefrom, and at a rate of horizontal movement which increases rapidly as H goes down in approaching strip Z until the horizontal rate of H and G is substantially the same as the rate of horizontal strip-feed during the downward passage of H through Z. Diagram B of Fig. 18 shows that H in its vertical movement has reached strip Z and its about to shear it (commencing at one side edge, left Fig. 7), H having gone down very rapidly as contrasted with its horizontal movement (i. e., faster than the latter during the first portion of the third quadrant) so as to commence its actual shearing movement thru the strip (after rapid downward movement from its highest point) shortly after having commenced its rightward travel in the same direction and at substantially the same rate as the feeding movement of the strip; the reversal of direction of horizontal movement of both G and H from leftward to rightward having occurred in the middle of the downward six-inch stroke of H. Diagram C indicates (by the dropping of sheared-off van end Z 1 of the strip Z and by the position of the lower edge of H well below the top edge of blade G) that H has completed the shearing which has been proceeding from (say) eight o'clock to seven o'clock, for example, altho the total duration of movement of H thru the strip Z may vary in extent of said shearing-arc and in position of the shearing-arc in the third quadrant between nine to six o'clock. Said position of the shearing-arc however always is where the rate of horizontal movement of the blades is substantially the same as that of the horizontal feeding movement of the strip Z. Diagram D shows that after completion of shearing there is a slight further downward movement of H during the revolution of the eccentrics down to six o'clock thru the latter part of the third quadrant, or during the time that the rate of horizontal movement of the two blades very rapidly is increasing to maximum; but that altho meanwhile H remains across the end of the new van end of the strip Z nevertheless it does not interfere with the continued uniform rightward strip-feed because H now is moving rightward faster than the strip which follows after it. Diagram E shows the blades back in their normal three o'clock positions of rest the same as at A, with H half raised; and diagram E shows that notwithstanding that the rate of rightward movement of the blades decreases very rapidly just before they come to rest, nevertheless by the time the uniformly fed strip catches up with the vertical plane of horizontally moving blade H, the later has been raised (during the first portion of the fourth quadrant from six to three o'clock) to a sufficiently high level so that H does not remain in the path of the strip-feed.

The vertical component of the travel of horizontal actuator 34 (in which actuator the blade-H-carrier 33 travels vertically) is the same (three inches) as that of its horizontal component; so that 33 (having a six-inch vertical travel) slides on ways 32 in 34; and so that in the first quadrant of eccentric revolution, (for example, while 34 is moving upwardly one and a half inches) the H-carrier 33 is moving upwardly three inches.

In the normal positions of blades G, H at rest (Figs. 6 and three o'clock Fig. 18 E) blade H is half-way between the termini of its six inch vertical stroke, so that in each of the first and fourth quadrants H is moved upward three inches, and downward six inches during each of the second and third quadrants.

The actual strip-shearing is completed almost instantaneously (Fig. 18 C) owing to the high vertical speed of blade H and notwithstanding that the cut is made progressively across the width of the steel strip from edge to edge owing to the inclination of the cutting edge of blade H.

In the positions of rest of both G and H they await (while most of the next length of stock is being fed) the next tripping of slave L by master K. Before the next horizontal excursion of G and H (during which H is to make its vertical excursion) the rear portions of strip Z (from which a forward end Z 1, Fig. 18C has been cut) is fed rightward continuously until the instant of the next tripping of slave L by master K to effect the actions of G and H at times proper to shear another portion of the strip Z of the same length as that previously sheared. The length of strip fed between successive shearing is many times greater than the length of shear-travel in the line of feed.

*Main power connections*

All the power-driven parts of the machine are driven by prime-mover P (Figs. 1–6) mounted on machine-pedestal Q. P may be any desired form of main driver, preferably an electric motor, which may be but need not be one of constant speed. It may be a variable speed induction motor or a variable speed direct current motor, preferably the latter.

To operate the above shearing mechanism via shear-shafts 40, 42, a small pinion 50 of any of the condensation products or other nonmetallic material) is fixed on the shaft of motor P (Fig. 3) and meshes with fly-wheel gear 51 which is mounted on quill-hub 52 A of drum 52 (Fig. 7) of the half-revolution slave-clutch L. Drum 52 normally idles on clutch-shaft 42 C; but when slave L is tripped by master K then the clutch-drum 52 is connected positively to shaft 42 C so as to drive shear-shafts 40, 42 via spur gears 44, 45 and 46 as above and effect the above excursions of blades G, H.

To operate rolls C 1 and C the pinion gear W (non-metallic) (Fig. 5) meshes with the above large fly-wheel gear 51 which operates the shearing mechanism. Pinion W is mounted on shaft X (Fig. 2) of R which is a reduction gear unit of well-known type for reducing the speed down from large gear 51. This reduction is effected, say six to one, thru suitable herringbone gearing (not shown) within the casing of unit R so that the driven shaft S of unit R rotates at a rate proper to rotate the rolls C and C 1. Shaft S drives ordinary friction clutch 159 (Fig. 2). A spur gear D is fixed to quill-hub 159 A of 159. This gear D meshes with gear 167 on shaft 172 (Figs. 4—5) which shaft operates thru the nest of intermeshing gears 169—170 on spindles 171—172, (in housing 155, Fig. 10) to operate double universal joints 150 connecting spindles 171 to the horizontal rolls C, C 1, Fig. 10.

To operate master K (Figs. 2 and 4) top sprocket U is mounted alongside the above gear D on quill-hub 159 A of friction clutch 159; and from U a chain V drives lower sprocket U 1 which drives constant speed shaft 35, Fig. 2, of master K. Master K is a variable (adjustable) speed transmission which is adjustable at the will of the operator by hand-wheel 65 (Figs. 1, 2 and 4) turning graduated (scaled) hand-dial 97 for a given job of desired length of sheared sub-lengths of the strip Z.

In the exemplary machine the coordination of the feeding and straightening rolls C 1, C of the shearing mechanism with master K is effected by the drive of all said parts via fly-wheel 51 driven by motor P; so that master K trips slave-clutch L to cause rotation of shear-shaft 42 at times proper to insure the shearing or other fabrication of the strip at portions thereof which are uniformly distant from one another; the construction of slave-clutch L (to be described) being such that it always acts uniformly, i. e., that the same time always elapses (at a given adjustment of dial 97 of master K for a given job) for the interval between the instant when uniformly-acting clutch L is tripped by master K, at the beginning, and the instant at the end when blade H is forced down thru the strip Z by heavy fly-wheel 51 for shearing it.

And master K is so constructed and coordinated with the feed of the stock (as will be described) that it always trips the clutch L at the instant when the same length of stock as before has passed rightward of blade H, so that with the above uniform action of clutch L between its tripping (to be described) there will be always (for a given adjustment of 97) the same length of strip Z to the right of blade H at the instant when H and G shear off a van end of strip Z. Furthermore the means for re-cocking the slave-clutch L, being under the control of the shearing mechanism operated by the clutch (as will be described) is such that said clutch is a uniformly acting clutch in the further sense that it always ends (as well as begins) its action in driving the shearing mechanism at the same instant relative to the rate of strip-feed, with the result that blade H is removed vertically from the path of the continuously fed strip Z before the latter in its horizontal movement reaches the vertical plane of said horizontally moving blade H, as above described; said re-cocking mechanism being cooperative with the shear-operating mechanism in order to obtain such desirable and practical operations as conform in a practicable manner to the most modern mill practice as heretofore employed in connection with the best prior type of shearing machines operating with an intermittently fed strip and non-traveling shearing mechanism.

*Master or automatic controller of tripping mechanism*

This automatically trips the slave-clutch L by mechanism to be described later.

As shown K itself is a variable (i. e., adjustable) speed-transmission of any form of the suitable type, such as the well-known Reeves transmission as shown in Figs. 25—26. It is adjustable by the operator for each job requiring different sheared sub-lengths of strip Z, by means of hand-wheel 65 and dial 97 without changing the normal strip-feed by rolls, C 1, C driven (like the shear-controls) by motor P. The scale on rotatable dial 97 is marked in feet and inches or the like by the manufacturer of the machine during the test operations thereof so as to indicate thereafter to the user the length of strip sub-length which will be produced by a corresponding setting of the scale on dial 97 which is geared down to the shaft 103 of wheel 65 via worm-gear 100 and worm 103 A, Figs. 25—26. Wheel 65 turns dial 97 with respect to a fixed index 98.

In general, Figs. 25—26, master K includes (first) the constant-feed shaft 35, Fig. 26, driven by the lower sprocket U 1, Fig. 4, and (second) the driven shaft 106 driven by belt 115 from shaft 35. The rate of rotation of 106 is the thing which is adjustable and adjusted via wheel 65, as indicated by dial 97. Shafts 35 and 106 each carries a pair of cone-faced pulleys, 113—113 on 35 and 114—114 on 106. These pairs of pulleys are connected together by a V-belt 115, Fig. 26, specially V-shaped to cooperate with said facing pairs of cone-faces so that when wheel 65 is turned to operate any desired intermediate mechanism (including sprockets 105 and 107, Fig. 25, connected together by chain 108) and thereby adjust said cone-faces to or from one another, then the driving ratio of the cone-pulleys is altered as desired in accord with the scale on dial 97, so that thereafter shaft 106 of master K is rotated continuously at the uniform proper rate to revolve tripping-stud 66 A to trip the shear-clutch L at uniform intervals coordinated with the feed of strip Z so as to cause uniform strip sub-lengths to be produced by the operation of shear-blades G and H.

In order to effect such automatic tripping, a crank-plate 66, Fig. 13, is connected to master-shaft 106 of the adjustable speed mechanism K. Plate 66 carries an eccentrically-mounted stud 66 A, and the latter actuates suitable tripping mechanism about to be described to allow automatic spring-depression of stop-plunger 69 (Figs. 15—16) from its normal position shown, wherein it restrains clutch L from operating to connect fly-wheel 51 to shear-shaft 42.

When the tripping mechanism is operated by master K (or an equivalent in any instance) then the constantly-rotating heavy fly-wheel gear 51 is locked substantially instantly to clutch-shaft 42 C so that the latter is turned a half-rotation to effect the excursion of blades G, H, as will be described in the description of clutch L.

Preferably in addition to the above automatic tripping mechanism, there is also provided a manually operated tripping mechanism, to be described later.

The above adjustable cone-faced pulleys 113—114 of Figs. 25—26 provide a means for coordinating the operation of shears G, H with the strip-feed (rolls, C, C 1, C, Fig. 1) so that by adjustment of wheel 65 the machine will turn out flattened uniform cut sub-lengths of any desired linear dimension, i. e., not merely to feet and inches but to fractions of an inch. The cone pulleys are mounted on shafts 35 and 106 so that their hubs slide axially thereof, as shown, said shafts being journaled in the rectangular frame, Fig. 26. On said frame are shifting-levers 111 pivoted to the frame intermediate their ends at 112, so that when the members of one pair of adjacent ends of said levers 111 are moved toward one another, the members of the other pair of adjacent ends are moved apart from one another. The ends of the levers 111 engage the sliding hubs of the cone-pulleys at 113 A—114 A. In the plan, Fig. 26, the ends of levers 111 nearest the constant speed drive-shaft 35 (driven by U 1) are connected via threaded nuts 110 on oppositely-threaded portions of rod 109 journaled in the rectangular frame. When adjusting-wheel 65 is turned to bring dial-scale 97 to the indication of the desired length of flattened cut stock, then said levers 111 are moved on their pivots so as to produce the rate of rotation of master-shaft 106 suitable to trip the shearing apparatus (by means of tripping stud 66 A) at times which result in such desired flattened lengths of sub-lengths. In the example shown, the hand-wheel 65 operates threaded rod 109 via shaft 103 journaled in fixed support 104, Fig. 25, and via sprocket 105 on 103, chain 108 and sprocket 107 on shaft 109. By turning wheel 65 thru a total range of say twenty-five rotations, and driving the constant-speed shaft 35 via sprocket U 1 at about say eleven R. P. M., (when tripping-stud 66A is revolved by shaft 106 at the rate of rotation of 106), thereby the adjustable-speed shaft 106 can be rotated at any of the different rates between 4 and 21 R. P. M. as may be desired. When 35 drives 106 at a lower rate than its own rate of 11 R. P. M., then cone-pulleys 113—113 are spaced more widely apart than are cone-pulleys 114—114, so that the V-belt 115 acts as if it were an ordinary flat belt on ordinary pulleys respectively of smaller diameter on 35 and larger diameter on 106;

and reversely when 35 drives 106 at a higher rate than its own rate. The stock is fed at a rate of from fifty to one hundred feet per minute more or less, and the desired range of cut stock sub-lengths may vary from a foot or more up to a great many feet, preferably with intermediate degrees of inches and even fractions of an inch, and all with reference to the rate for feed-rolls C, C1 which produces uncurved or flattened sub-lengths of the desired uniform length for a given adjustment of the machine as above. In order to obtain the desired range from the shortest to the longest cut sub-lengths, the arrangement of shifting-levers 111 and shaft 103 is such that a substantial number of turns of handle 65 (usually twenty or more as above) is required to carry adjustable-speed shaft 106 from its lowest to its highest desired rate. Dial 97 is marked with the desired range of cut sub-lengths in an arcuate series extending not more than 360° around the dial and preferably a little less; and 97 is driven by wheel 65 via reduction gearing such as worm 103 A on shaft 103 and worm-gear 100 on dial shaft 99; so that the dial will not turn more than 360° when wheel 65 is rotated many times thru its entire range. In some cases the dial 97 may carry several hundred markings covering the entire range of cut sub-lengths at one-quarter inch succession, the marks on the dial being say one-sixteenth inch apart, and in such cases the dial is made of sufficiently large diameter to permit it to include all such markings in a single arcuate series at or near its periphery. The disclosed cone pulley arrangement is preferred wherein the cone-faces 113—114 are adjusted and the belt 115 kept in constant position.

While master K preferably and as shown is an adjustable-speed mechanism operated by motor P and fly-wheel 51 and is coordinated with feed-and-straightening-rolls C 1, C, and while such a coordination is practical provided that the operator properly uses the adjustments disclosed for said rolls so as to preclude slipping of the fed strip Z relative to the said rolls, nevertheless it is permissible within some aspects of the present invention to obtain the desired coordination between strip-feed and shearing operation of the traveling aerial shearing mechanism, by the provision of master mechanism operated by the van end of the fed strip Z itself, or even by the feed-rolls themselves, so as thereby to operate the mechanism for tripping slave- or shear-clutch L; such control of shearing by the van of the fed strip being disclosed in my co-pending application for patent Serial Number 291,651 filed 10 July 1928, and such control by the feed-rolls being disclosed in my co-pending application for patent Serial Number 403,716 filed Oct. 31, 1929.

*Tripping mechanism for shear-shaft*

The construction of the tripping mechanism operated by crank-plate 66 and stud 66 A of master K is as follows, Figs. 13-17.

Operating mechanism is located between said crank-plate 66 and a detent or sear 67 which latter (Fig. 13) is movable horizontally and engages in a lateral recess 185 in vertically-movable plunger 69 to lock said plunger in its normal position in the path of revolution of stop-noses 56 B of clutch L whereby said clutch is prevented normally from connection to the shearing mechanism including blades G, H. A spring 70 normally tends to pull stop-plunger 69 downward out of the path of noses 56 B and said spring 70 acts as soon as detent 67 is moved from its locking recess 185 in 69 which is done by crank-plate 66 via the following mechanism.

The above stud 66 A which controls the rest of the tripping mechanism is mounted eccentrically on said crank-plate 66 of master shaft 106, said stud 66 A being a pitman-stud which actuates slide 86 and latching-pawl 92 pivotally connected thereto at 91. The other end of pawl 92 is formed with a hooked latching portion 92A and that engages with detent 67 (Fig. 13). Detent 67 is formed with a vertical opening up thru which extends plunger 69 which normally keeps clutch L from operating the shearing mechanism G, H. When hook 92A engages detent 67 it moves the latter horizontally out of engagement with the locking recess 185 in plunger 69 (Fig. 13) during the first part of the reciprocation of slide 86 by master shaft 106, thereby compressing spring 68 which thereafter stands by to force detent 67 back (as soon as pawl 92 permits) to abut against plunger 69, above its recess in its present depressed position. The hooked or movable end 92 A of pawl 92 is provided with a guiding cam-plate 96 (Figs. 16—17) by which 92 is vertically movable into and out of horizontal alinement with detent 67. Cam 96 is formed with an opening (Fig. 17) provided at its lower portion with the lower and upper ways having the connecting incline shown, for travel of roll 95. Stud 93 is connected to pawl 92, and roll 95 is bushed at 94 on said stud. Normally, i. e., when roll 95 is on the lower level of cam 96 as in Fig. 17, the hooked end 92 A of pawl 92 is in horizontal alinement with detent 67, and during the first part of the forward stroke of slide 86 and pawl 92 said hooked end 92 A of the latter engages detent 67 and moves it to trip the plunger 69. But as the forward stroke of 86 and 92 continues, the roll 95 climbs to the upper level of cam 96 (at left in Fig. 17; after spring 68 has been compressed) and thereby lifts hook 92 A up out of horizontal alinement with detent 67 which thereupon is sprung back against 69 in readiness to engage in the locking recess 185 therein as soon as 69 has been raised up into the path of 56 B by the re-cocking mechanism later to be described. On the return stroke of pitman 85, slide 86 and pawl 92—92 A, the hook 92 A rides idly back on top of detent 67 (now abutting against plunger 69) until said hook passes beyond 67, and then roll 95 drops off the end of 67 (i. e., from the upper level of cam 96) to the lower level thereof and carries hook 92 A (swinging on pawl-pivot 91) down once more into the horizontal path of detent 67 (at left thereof) in normal position of rest of 67 in preparation for the next revolution of crank plate 66 and stud 66 A by master shaft 106 of adjustable-speed master K.

Housing 73 (Figs. 14-16) is provided for the above tripping mechanism. Slide 86 is held in slidable contact with cover plate 74 of housing 73 by means of two gibs 87. Plate 74 is formed with an opening 74 A in back of slide 86 to allow for reciprocation of pawl 92.

The above retraction of detent 67 from its locking recess in plunger 69, and the return of 67 to the side of 69 above its locking recess while 69 yet is down out of engagement with clutch-nose 56 B, places said parts in position to be re-cocked to lock the clutch L in its normal condition not driving the shearing mechanism, said parts being then ready to be fired or tripped again via master K as above.

Cocking or re-latching mechanism

This is operated by way of the shearing mechanism as shown in Figs. 6, 7 and 13 by the power from prime-mover P.

In the exemplary machine the part of the shearing mechanism which operates this cocking mechanism may be, and is shown as, the lower end of nutating frame 34 Figs. 6—7, the primary function of which is to cause the horizontal actuation of both shearing blades G, H. The re-cocking operation by frame 34 includes the upward movement by the lower end 75 of 34, of stop-plunger 69 (Figs. 13-16) to return it to its normal position in the path of revolution of either of the two stop-noses 56 B of clutch L. The re-cocking is effected by the downward movement of frame 34 and its bottom plate 75 (twelve to six o'clock, Fig. 18) prior to final upward movement of 34 and 33 by which latter movement the blade H is raised from its lowest position (just after shearing) to its intermediate vertical position or normal position of rest. Stop-plunger 69 is moved upward by frame 34 to its normal clutch-stopping position in ample time before one of the stop-noses 56 B reaches the normal position of the plunger.

The complete operating mechanism between shear-actuator 34 and plunger 69 is as follows, Figs. 6—7, 13. On the lower end of actuator 34 is fixed a wearing-plate 75 which engages with roll 76 journaled in the bifurcated end of lever 77 pivoted on shaft 80 journaled in stationary bracket Q 1 secured to the machine-frame or bed-casting Q. The lever 78, also pivoted on shaft 80 and thereby operated by 77, engages the lower end of clutch-stop 69. So, when actuator 34 goes down (from twelve to six o'clock, Fig. 18) it engages roll 76 and swings the end of lever 77 down on its pivot 80 to lift clutch-stop 69 via lever 78 (stretching spring 70) in front of clutch-nose 56 B and allow spring 68 to push detent 67 into the locking recess in 69; (for before 34 goes down to do the latter, the hooked end 92 A of pawl 92 has been carried to the upper level of cam 96, Fig. 17, and thereby has been lifted from the path of detent 67 whereupon previously compressed spring 68 has pushed 67 against the side of 69 ready to engage in the slot 185 in 69 as soon as the latter goes up); and later, when nose 56 B is stopped in the half-revolution of its clutch L, by abutting against plunger 69 at the end of the effective partial rotation of clutch basket 56 and the end of excursion of blades G and H, then the locking-rolls 57 of the clutch L (Fig. 13) are moved from their driving positions, and clutch-drum 52 driven by fly-wheel 51 thereby is disconnected from clutch-shaft 42 C which constitutes the drive for blades G and H. Detent 67 in said position (locking the stop-plunger 69) is ready to be retracted later from 69 by pawl 92 at the proper time to cause clutch L again to operate blades G and H via shaft 42 C.

Manual control of tripping mechanism

Manually controlled mechanism is provided, as shown in Figs. 19-24, to trip shear-clutch L at times other than its tripping as above by master K. This is useful on various occasions, as in setting the master initially for each roll of strip started thru the machine from reel-stand A, to avoid waste as by cutting a sub-length too short but yet of substantial linear dimension and in cutting off a short end portion of the initial strip van to get a square end on the first regular sub-length to be cut but without undue waste, or to cut out a defective portion from the strip Z without impairing the indexing thereby preserving uniform cut sub-lengths under control of master K, and at the same time without undue waste of stock.

In normal automatic operation, the shear-clutch L is tripped to cause operation of shear-blades G, H, by engagement of eccentric stud 66 A with detent 67, Figs. 13-17. Said tripping stud is revolved by crank-plate 66 rotated by shaft 106 of master K which may be a Reeves transmission adjustable by dial 97 as shown in Figs. 25—26, to shear off uniform sub-lengths of strip Z which shall have the desired linear measurement.

Figs. 19-24 show hand-controlled mechanism for revolving tripping stud 66 A independently of the automatic control by master-shaft 106, but related to 106 in such manner that the automatic control and the hand-control shall be interrelated so as to maintain indexing and preserve continuity of coordination between the master-control and the strip-feed thereby always producing uniform cut sub-lengths by the automatic operation of the master notwithstanding occasional shear-operation by manual operation of tripping control.

For this purpose a suitable quick-acting clutch is connected between master-shaft 106 and crank-plate 66 which carries tripping-stud 66 A. This clutch may be of the roll-wedging type 186, Fig. 19, shown in detail in Figs. 22-24. The clutch-body 178 is fixed to shaft 106, and the clutch-hub 186 may be integral with crank-plate 66 as shown.

During the normal operation of the automatic master control K the clutch-rolls 179 are kept (forced by their springs 181) in their wedging positions, Fig. 22, between hub 186 and body 178, so that tripping-stud 66 A is revolved normally by 106 at a rate determined by the operator's initial setting of dial 97, Figs. 13-17 for master K. Hub 186 of this quick-acting clutch normally is the driven member but it can be forced under any suitable desired control to move at a rate faster than normal in its normal direction; and such faster movement will force rolls 179 a very minute distance against their springs 181 thereby uncoupling hub 186 from body 178 and shaft 106, so as to cause the faster rate of 186 to accelerate the revolution of tripping-stud 66 A and advance the time of its engagement with detent 67 of the tripping mechanism for shear-clutch L so as to cause a shearing operation by G, H at any time desired by the operator in advance of the next automatic tripping by master K. While 186 is revolving 66 A thus to advance the tripping time, the master-shaft 106 continues rotation at its normal lower rate and stands by to resume its revolution of stud 66 A as soon as the temporary manual acceleration of hub 186 ceases, and particularly upon cessation of the driving of 186 by any other force than 106; for then the above effect of accelerated hub 186 on rolls 179 also ceases, and the springs 181 force rolls 179 back over said very minute distance to their normal wedging positions between 186 and 178, Fig. 22, and cause 186 again to be driven as normally by master-shaft 106. Thus the operator may take over hand control at any time; and the time of clutch-tripping will be advanced thereby as compared with automatic tripping, provided that the hand control be exercised at a time intermediate the times of two successive automatic trippings by master K. And if such accelerated movement of hub 186 of the quick-acting clutch on 106 be stopped immediately upon the resultant tripping under hand-control, then said clutch 178 on 106, instantly taking over control of tripping stud 66 A thereby, will resume its normal operation resulting in causing uniformly spaced times of shear-tripping (with reference to strip-feed rate) and resulting shearing of uniform lengths of strip Z.

But if the operator watching the progress of the fed strip Z desires to defer hand-tripping until just prior to an instant of normal automatic tripping, then only a short arc of accelerated angular motion of clutch-hub 186 is needed to complete the revolution of stud 66 A to its next tripping position; and if the manual control be directly mounted on hub 186 as a means for manual operation of said hub, then there is likelihood of the accelerated revolution of stud 66 A being extended beyond its tripping position, and in that event the next sub-length cut from strip Z under automatic control would be shorter than normal and involve an undue waste.

To insure against such overrunning of clutch-hub 186 by operation under normal control, and in order to preserve indexing for uniform cut sub-lengths, and for other purposes, there is provided the mechanism of Fig. 19 as a supplement to and cooperative with the quick-acting clutch 186, 178. This mechanism includes a continuously rotating counter-shaft 47 journaled at 176, etc. and normally driven by master-shaft 106 at the same rate thereof by like pinions 177 and 66, the latter as shown being the crank-plate which carries eccentric tripping-stud 66 A and formed for this purpose with peripheral teeth always in mesh with 177. This apparatus includes also means for accelerating shaft 47 such as a toothed member 28 (shown here as gear segment centered on shaft 27) under hand control and always meshing with pinion 29 which normally idles on continuously rotating shaft 47. Member 28 is operated to accelerate 47, disconnect 66 from 106 and drive 66 by 47. Also a positive-locking clutch 49 is keyed at 83 to shaft 47. This shaft carries a dial 119 at the front of the machine near handle Y which latter controls operation of toothed member 28, and actually operates the latter in the arrangement shown which includes shaft 27 to which both Y and 28 are fixed.

When 28 is moved at the will of the operator to advance the time of shearing, then the normally rotating clutch 49 on counter-shaft 47 is locked positively to normally idling pinion 29 so that 28 (1) causes acceleration of clutch-hub 186 of the quick-acting clutch, thereby (2) quickly uncouples said hub from its clutch-body 178 on master-shaft 106 as above, and (3) advances the time of engagement of tripping-stud 66 A with the tripping mechanism of shear-clutch L.

The overrunning of quick-acting clutch-hub 186 which would carry stud 66 A beyond its tripping position is prevented by some such means as the right hand stop 13, Fig. 1, mounted on a stationary portion of the machine in a position to stop the tripping movement of 28, as in the path of handle Y in a case as shown when the latter applies the moving force to 28. This stop 13 insures that 66 A shall not be moved by 28 beyond its tripping position indicated in Fig. 20 by the coincidence of the dial arrow with the arrow marked on a stationary portion of the machine; the angular disposition of positive-locking clutch 49 on 47 by key 83 being such that at the instant of tripping and prior thereto the deep end of inclined slot 29 A is in clutching engagement with the pin 116 of this positive-locking clutch.

Before 28 is moved to start turning pinion 29 on continuously rotating shaft 47, the pin 116 is carried idly around the end face of 187. Being held thereto by its spring 117 and revolving anti-clockwise, this pin 116 is forced into the deep end of slot 29 A in 187, and then during its continued revolution is carried back to the level of said face of 187 by the inclined bottom of the slot. (Collar 48 pinned to shaft 47 keeps 29 and 187 from being moved rightward by spring 117 and pin 116.) But whenever 28 is moved from left hand stop 13, Fig. 1, to the right hand stop 13, (left to right, Fig. 20) the then consequent rotation of pinion 29 causes the deep-end-wall of slot 29 A quickly to overtake pin 116 in normal slower rotation ahead of it, and causes the above drive of 47 and 66 by 28, via 177.

The provision of (1) means for stopping 28, (such as right hand stop 13, Fig. 1) forthwith upon the tripping-action by 66 A, and (2) of the quick action of clutch 186, 178 for thereupon instantly re-establishing control of tripping by the master K at that instant of stopping, insures that always after a hand-controlled tripping, the next shear-cut caused by the master K will be at an instant after the uniform time-interval of master-tripping which is in accord with the setting of master-dial 97 for the coordinated rate of strip-feed; so that no matter what particular location of the strip Z be sheared under hand-control, the next tripping by master-control will result in the desired uniform length of cut strip sub-length. And for the purpose of cutting out a defective portion of the strip Z between successively produced good sub-lengths, and with minimum waste, the above hand-trip control may be operated twice during the time between normal successive tripping actions of stud 66 A by master K, i. e., during the feed of a portion of the strip Z which corresponds to the normal cut length; altho of course upon each exercise of the hand-control, the tripping stud 66 A is revolved to its tripping position. For permitting hand-control at any time between successive normal operations of 66 A, the path of forward operating movement of toothed member 28 left to right, Fig. 20, is such as to cause substantially a complete rotation of normally idling pinion 29; altho the angular motion of shaft 47 which is caused by 28 to turn 66 A to the tripping point is less than 360° being dependent upon the movement of 66 A by master-shaft 106 after the last prior automatic tripping and previous to the manual operation of 28. Thus the hand-control can be effected immediately after or immediately before automatic tripping, (just after or just before twelve o'clock, Fig. 20), and at any time between successive automatic trippings. Owing to the quick-acting nature of clutch 186 on master-shaft 106 the latter drives stud 66 A at all times even when the latter is not driven by hand-controlled toothed member 28; so that when the hand-control is exercised then 28 picks up (via 47, 177 and 66) the operation of 66 at the point where 106 lets go of 66, owing to the positive locking action of clutch 49 which insures uncoupling of 106, and owing to the fact that 106 continues to operate 66 until 106 is forced by 49 to uncouple. While the continuous rotation of 106 causes time-lags between the initiation of movement of 28 and the locking engagement of clutch 49, (those lags being of varying length dependent upon the instants of initiation of movement of 28), yet they are not actually long in time and readily are discounted by the skilled operator who is able to obtain cuts at substantially the points of strip Z he wishes with a minimum of waste of cut strip and without disturbance of automatic indexing of cut lengths. In other words, hand-tripping and shear-operation will be effected when the hand-tripping mechanism is stopped by 13 at right, Fig. 1, regardless of occurrence of such clutch-lags during the movement of the hand-tripping mechanism from its initiation at the left.

When handle Y abuts against right-hand stop 13, Fig. 1, then pinion 29 stops turning and normally the revolving pin 116 resumes its normal travel out of the slot 29 A in 187 on 29, and around the end face of 187, Fig. 21. Thereafter at any time at the convenience of the operator, the handle Y and 28 can be moved back to their normal positions at left, Fig. 20.

The above hand-tripping combined substantially as above with the master tripping control possesses the advantage as follows in initiating accord between master K and a given strip Z to be fabricated. Altho, independently of the hand-tripping control, the master-control is coordinated with the rate of operation of the strip-feeding means, (preferably with flattening by the feeding means) so as to result in cut short flat strips of uniform length, yet at the commencement of feed of a given strip Z it might happen that a portion of the strip almost equal to a length desired to be cut off might be fed beyond the shearing blade before the first tripping by the master K and consequent operation of the shear. In such event the first cut sub-length would be too short and in that sense a waste. But such waste is preventable by the above combination of hand-tripping control and automatic tripping control because the operator watching the strip-feed can cause (via Y) the first tripping for the new roll of strip, and the consequent passing down of blade H across the path of the strip), to occur very promptly indeed after the initial van of the strip has passed horizontally beyond the blade H, so that the first shearing-cut thru the strip will cut off a minimum length of say three inches up to one foot, i. e., no more than is useful to remove an uneven or mutilated crop end and produce an end suitably square for the cut sub-length of stock; and furthermore, from the instant of shearing caused by such hand-tripping there will commence the effect of coordination between master K and the feeding means for the strip Z, with the result that the first regular cut length (after such shearing off of a crop end), as well as the subsequent cuts, will be of the desired uniform length according to the setting of dial 97.

Slave or shear clutch

The construction of slave-clutch L which causes commencement of the cycle of the shearing apparatus substantially instantly upon the tripping by the detent 67, (or at least always at the same time after such tripping for a given rate of stock-feed, i. e., as a uniformly-acting clutch), is as follows, Figs. 7 and 13. The operation of this is the same for either automatic or manual tripping operation of detent 67. Primarily this clutch L preferably is of the roll-locking type shown, but in the present embodiment and combination there are various novel features which are included in the following description and shown in the drawings. When tripping-detent 67 has been withdrawn (pushed) from stop-plunger 69 (to left, Fig. 13) the latter is free to be and is pulled down by its spring 70 out of engagement with stop-nose or lug 56 integral with basket 56 for locking-rolls 57; spring 70 having an end anchored at 84, its other end being secured at 82 to the end of lever 81 and acting to pull 81 upward. This causes normally rotating clutch-drum 52 to be clutched to clutch-body 55 and clutch-shaft 42 C for operation of shearing blades G, H via shear-shaft 42 geared to 42 C as above.

Rolls 57 are moved radially outward and circumferentially to lock drum 52 to body 55 and shaft 42 C splined thereto at 54. Basket 56 for the locking-rolls 57 is mounted rotatively (Fig. 7) on extending hub 55 A of clutch-body 55, and held on said hub by plate 58, the latter being held in place by adjustable nut 59 on the reduced end of clutch-shaft 42 C.

When plunger 69 has been pulled down by its spring 70 from in front of one of the two noses 56 B then basket 56 is free for rotation and is rotated (Fig. 13) anticlockwise by automatic means to be described; and such rotation causes fingers 56 A (one for each roll 57 and engaging between ring 53 and the perifery of clutch-body 55) to move rolls 57 both circumferentially and radially outward (along inclines 55 C in hardened steel clutch-body 55) from their cooperating recesses 55 B in said clutch-body to their locking positions against ring 53 thereby effecting the positive locking of clutch-drum 52 to body 55 and shaft 42 C, so that forthwith there is established a positive driving linkage between fly-wheel 51 and drum 52 on the one hand and shafts 42 C and 42 and shearing blades G, H on the other. Ring 53 is a hardened steel liner of overhanging cup 52 B).

Thus the normally idle clutch-shaft 42 C intermittently is locked to the continuously rotating heavy fly-wheel driving-gear 51 for time intervals which are brief relative to the times of rest of shear-shaft 42 driven by clutch shaft 42 C; but each of such brief times is sufficient to allow a complete rotation of shear-shaft 42 and its eccentrics and a complete shearing excursion of blades G and H to act on the traveling stock Z.

As shown in Fig. 13, there are two clutch stop-noses 56 B on roll-basket 56 located diametrically opposite one another for successive cooperation with single stop-plunger 69. Thus clutch L makes only a half rotation for each excursion of blades G, H, the above transmission between clutch L and the shearing mechanism being proportioned so that a half rotation of clutch-shaft 42 C will effect a complete rotation of shear-shaft 42. This limitation of motion of the clutch parts to a half-revolution for each complete cycle or excursion of blades G, H insures not only ample power but positive and accurate locking and unlocking of the clutch-parts by causing a sufficiently low speed of the inner surface of ring 53 which engages locking rolls 57; thus when said rolls are wedged between the stationary inclines 55 C and said slow-moving inner surface of ring 53 then the locking and unlocking actions of the rolls are assured of operation according to their design. The tripping and re-cocking above described with respect to plunger 69 and stop-nose 56 B of course is the same for each of the duplicate noses 56 B.

The means for turning basket 56 when the latter is released by detent 67 and plunger 69, is the helical spring 60 (Figs. 2 and 7) arranged around the outside of basket 56. One of the ends of spring 60 is anchored to plate 58 and the other to basket-lug 56 B. Spring 60 always tends to rotate basket 56 anti-clockwise (Fig. 13). Initially it is put under stress by the constructor who (Figs. 5 and 7) turns plate 58 (to which one end of spring 60 is anchored) until the desired stress is produced and then a pin 30 is passed thru plate 58 and into one of the holes 31 (Figs. 7 and 13) to hold plate 58 against being moved radially by spring 60. Then nut 59 on the end of shaft 42 C is tightened against plate 58. The arrangement of spring 60 on the outside of basket 56 not only makes it easy of installation, adjustment and inspection but permits it to have a large diameter useful in acting quickly to turn basket 56 and lock the drum 52 positively to clutch-body 55.

All the above initiation of rotation of shaft 42 by massive driver 51 and drum 52 occurs in a very short time indeed, very much shorter than the brief moment of half-rotation of shaft 42 C, and always (for successive operations) in the same length of time (for a given rate of stock-feed), i. e., the time between the instant of the tripping action of crank-plate 56 A, pawl 92 and sliding detent 67, and the immediately subsequent instant when clutch-body 55 begins to rotate shaft 42 C anti-clockwise to start the cycles of blades G, H from their normal positions of rest. During the half rotation of clutch-shaft 42 C which effects the complete rotation of shear-shaft 42 and the horizontal excursion of G and H, the plunger 69 (Fig. 13) has been moved upward to resume its normal (re-latched or re-cocked) position in the path of the anti-clockwise revolution of the next-acting stop-nose 56 B. This normal position of 69 is reached in advance of the completion of the excursion of blades G and H; the re-cocking being effected substantially while the stock Z is being sheared, altho of course before said nose reaches said normal locked upper position of 69. As soon as said nose 56 B abuts against said stop 69 lying in its path, the roll-basket 56 disengages locking-rolls 57 from their locking and driving positions between clutch-drum (steel-lined as by ring 53) and clutch-body 55 as above; and then clutch-body 55 and shaft 42 C, thereby disengaged from the positive drive via rolls 57, immediately come to rest under action of brake-band 62 (Fig. 3) for brake-drum 61 on shaft 42 C, and they remain at rest in readiness for the next half rotation of shaft 42 C, to effect the next shearing excursion of blades G and H after the continuous feed flattening of the stock has advanced a sufficient length of it to require initiation of such next excursion of G and H to shear off the same length as before, as determined by the operator's adjustment of dial 97. The heavy fly-wheel drive 51 for clutch-drum 52 and the mass of the continuously running portion of the clutch provide sufficient energy not merely to initiate the intermittent abrupt horizontal excursions of blades G and H and the upward movements of H, but to insure the downward movement of H against the resistance of the more or less heavy stock undergoing shearing,—such energy of course being continuously added to by the continuous operation of motor P during the excursions of G and H.

Spring 60 is re-wound (twice for each complete rotation of clutch-shaft 42 C) as the result of the above operations of stopping the intermittent movements of clutch-body 55, shaft 42 C, and the shearing apparatus; in fact, such restoration of the higher tension of said spring cooperates with brake 61 in bringing said parts to a quick stop. In such re-winding, and just after plunger 69 is raised up in front of basket-nose 56 B and the latter abuts the former, (i. e., while rolls 57 are moving from their locking positions), and before said shearing parts come to rest, there is a definite drift of the elements driven by rolls 57, including the parts carrying the spring 60, (i. e., a drift of about twenty degrees of rotation of clutch-shaft 42 C, said drift being always of the same time interval relative to the rate of stock-feed) as the result of the uniformity of clutch-operation as to time for all repeated operations at the same setting of dial 97. Spring 60 is wound up by that definite drift. A similar and uniform drift occurs in starting. Some extent of such drift will be present to a degree in starting and stopping regardless of the use of any such spring.

*Summary of operation*

The above excursions of blades G, H occur intermittently during the continuous feed of the stock (Figs. 1 and 6) by and thru the straightening mechanism in the roll-stand at the left from which the strip steel Z is fed direct to the adjacent shearing mechanism at the right. But as shown the result of uniform sheared sub-lengths is obtained by simple power connections from common motor P which drives in synchronism the feeding and straightening mechanism, the shearing mechanism and the controls for the slave-clutch L which include the variable-speed transmission K as the master and also the cocking mechanism.

The actual passage of shear-blade H thru the sheet-stock takes only a very small portion of the total time of operation of the shearing mechanism as a whole including the likewise very small times of the initiation and discontinuation of the clutching action of slave L, i. e., the uniformly-acting shear-clutch preferably in the form of a roll-locking clutch; and during all the time of action of all the shearing mechanism and its controls there is a feed of a substantial portion of the stock (from fifty to one hundred feet per minute more or less) altho most of the stock is fed during the periods of rest of the shearing apparatus. That is, master K acts to trip clutch L before the rear of the desired length of stock to be sheared has been fed to the horizontal position of fabrication by vertical movement of blade H; but the setting of dial 97 which determines such time of tripping has been predetermined (as above by the maker of the machine after its completion) to be that which is proper to result in shearing movement of blade H at a later instant when the rear of the desired stock-length to be sheared shall have reached the position of fabrication by blade H. And for the same setting of dial 97 the time interval always will be the same between the earlier instant of the trigger tripping action by master K and the later shearing movement of blade H, (for a given coordinated stock-feed), as the result of the uniformly acting construction of clutch L whereby its clutching action at successive operations always occupies the same period of time relative to the rate of stock-feed; that is, in effect, the clutching action is practically instantaneous, the action of the locking-rolls 57 being analogous to the action of a trigger of a fire-arm in releasing the hammer. Also the intervals of time between successive clutch-trippings by master K always are the same relative to the rate of stock-feed. And the re-cocking operation on stop plunger 69 is completed within the time of the shear-operating turning of clutch-shaft 42 C. So that from all the above it results that the total time between successive downward shearing movements of blade H always is the same, as the cycle-time of master K, relative to the stock-feed, and due to the coordinated operation of main driver P and the elements driven thereby including the feed rolls C, C 1, the slave-clutch L, and the master K operating tripping detent 67 for plunger 69 which normally prevents flywheel 51 from operating the shearing mechanism. The operation of the above re-cocking mechanism is timed uniformly (to accord with the timing of the other elements) by means of its operation by the shearing mechanism, itself controlled as to time by the master K, so that in effect master K controls both the cocking and the firing of the shear-clutch stop-plunger 69; the re-cocking here by way of the movement of the shearing mechanism being analogous to operation by a re-coil in a firearm. But the exact relative time of upward movement of 69 for re-cocking is immaterial to the result of uniform lengths of sheared stock, because such movement may be effected at any time after firing and before one of the clutch stop-noses 56 B reaches the normal raised position of plunger 69, without reference to the instant of shearing; the facts being that detent 67 springs back to its re-cocking position during the second quadrant of the shear-cycle (Fig. 18, and see cam 96, Fig. 17), the upward re-cocking movement of stop-plunger 69 following (via shear-actuator 34) in the third quadrant to complete the cocking by raising 69 so that its lateral recess 185 is in horizontal alinement with detent 67; all followed in the last quadrant by the first movement of pawl-hook 92 A (Fig. 13) back over 67 and down to normal position of rest alongside the end of 67 in readiness for the commencement of the next cycle of the tripping mechanism initiated by shaft 106 of master K.

I claim:

1. In a machine for shearing a wide but relatively long metal strip into shorter but equal sub-lengths, the combination with a roll-stand, of an adjacent shear-stand normally stationary but reciprocable to and from the adjacent roll-stand lengthwise of the strip; wide rotatable rolls with their long axes arranged transversely of the strip substantially from edge to edge thereof, feeding the same lengthwise and journaled in the roll-stand; a shear-carrier also normally stationary but reciprocable in the shear-stand to and from a surface of the strip and arranged transversely of the strip; a shear-blade fixed to said carrier and also arranged transversely of the longitudinally fed strip and carried thru the strip by its said carrier; shear-operating mechanism reciprocating said shear-stand and shear-carrier, a drive-shaft; mechanism connecting said drive-shaft continuously with said transverse feed rolls; mechanism including a uniformly-acting clutch for operatively connecting said drive-shaft to the shear-operating mechanism at desired times; mechanism normally locking said clutch in inoperative relation between the drive-shaft and shear-operating mechanism; a master device for unlocking said clutch to cause the drift-shaft to operate the shear-operating mechanism; an adjustable-speed mechanism continuously operated via said drive-shaft and operating said master device; mechanism operated by the shear-operating mechanism to re-lock said clutch in inoperative relation between the drive-shaft and shear-mechanism; and alternative mechanism operable at will for operating said master device and constructed and arranged to keep said continuously operated adjustable-speed mechanism and said master device from operating connection with one another while said alternative mechanism is operating said master device.

2. In a machine for fabricating long relatively narrow metal stock at desired portions of its length at equal distances from one another, the combination with mechanism for feeding the long stock lengthwise, of normally stationary fabricating mechanism reciprocable longitudinally of the stock; mechanism continuously operating the feeding mechanism; mechanism intermittently operating the fabricating mechanism; a master device controlling the times of operation of said mechanism for operating the fabricating mechanism; mechanism coordinated with the feed-operating mechanism, continuously operating, and constructed normally to connect with said master device to operate the same; mechanism alternatively connectible to said master device to operate the same; and mechanism operable at will to operate said alternative mechanism; said alternative mechanism being constructed and arranged to keep said continuously operated coordinated mechanism disconnected from said master device during the operation of the latter by the alternative mechanism.

3. In a machine for shearing long relatively narrow metal strips transversely into shorter but equal sub-lengths, the combination with rotatable feeding rolls extending transversely of the strip and located to engage the opposite surfaces thereof, of a normally stationary shear-stand adjacent said roll-stand, said shear-stand receiving the strip fed therefrom, reciprocable to and from said roll stand along the line of stock-feed, and including a normally stationary shear-blade extending transversely of the strip and movable toward the plane of and thru the strip mechanisms respectively rotating said feeding rolls and operating said reciprocable shear-stand and movable blade; common driving means for both said mechanisms; mechanism continuously connected between said driving means and feeding-rolls during the operation of the machine; a uniformly-acting clutch interpolated between said driving means and said shear-operating mechanism and normally disconnected by the latter, mechanism initiating successive connections of said driving means via said clutch with the shear-operating mechanism; adjustable-speed mechanism automatically controlling said initiating mechanism; relatching mechanism operated by the shearing mechanism and normally holding the clutch in condition disconnecting the shear-operating mechanism from the driving mechanism; manually operable mechanism controlling operation of said tripping mechanism at any time desired during operation of said adjustable-speed mechanism; and clutching mechanism between said manual trip control and said adjustable-speed mechanism, causing idling of operation of the adjustable-speed mechanism upon operation of the manual mechanism and causing resumption of effective operation of the adjustable-speed mechanism upon cessation of operation of the manual mechanism.

4. In a machine for shearing a wide but relatively long metal strip into shorter but equal sub-lengths, the combination with mechanism feeding the strip lengthwise, of a normally stationary shearing-blade arranged transversely of the strip and movable toward a flat surface thereof, a normally stationary shear-stand carrying said blade and itself reciprocable in the direction of strip-feed; mechanism continuously operating said feeding mechanism; mechanism connected to said shearing mechanism for operating the same at desired times; mechanism connectible to said shear-operating mechanism, to drive the same; uniformly-acting power-operated mechanism arranged to connect said shear-operating mechanism with its said driving mechanism; a master device constructed and arranged to operate said connecting mechanism intermittently at times in accord with the strip-feed; power-driven mechanism coordinated with said feed-operating mechanism, continuously operating and normally driving said master device; and manually operated mechanism constructed and arranged to disconnect said coordinated mechanism from said master device and itself operate the latter while the coordinated mechanism continues in idle operation.

5. In a machine for fabricating long relatively narrow metal stock, the combination with a stationary feeding-roll stand including rotatable feeding rolls, of a fabricating-tool stand which is adjacent to and reciprocable to and from said roll stand, and including a fabricating tool carried by said tool-stand but itself movable relative to said tool-stand in a direction toward the fed stock and thru the stock; mechanisms reciprocating said tool stand moving said tool and rotating said feed-rolls; a plurality of mechanisms respectively adjusting said feed-rolls individually to and from one another; and mechanism operable at will to connect said adjusting mechanisms together for their collective adjustment operation.

6. In a machine for fabricating long metal stock, the combination with mechanism feeding the stock lengthwise, of a normally stationary shear-stand reciprocable in the line of stock-feed and including a shearing-tool carried by the shear-stand, said tool itself being movable relative to the shear-stand in a direction toward and thru the stock; of adjustable-speed mechanism automatically controlling the times of reciprocation of the shear-stand and movement of the shear-blade in desired times of relation to the rate of feed of the stock; manually operable mechanism controlling the shear-stand reciprocation at any times desired during operation of said adjustable-speed mechanism; and clutching mechanism between said manual mechanism and adjustable-speed mechanism causing idling of operation of the adjustable-speed mechanism upon operation of the manual mechanism and causing resumption of effective operation of the adjustable-speed mechanism upon cessation of operation of the manual mechanism.

7. In a machine for shearing a wide but relatively long metal strip successively into shorter but equal sub-lengths, the combination with wide feeding rolls extending transversely of the strip and located to engage the opposite faces thereof, of a shear-stand adjacent said roll-stand, and receiving the fed strip therefrom, said shear-stand being normally stationary but reciprocable to and from said adjacent roll stand in the line of strip-feed, said shear-stand carrying a shear-blade extending transversely of the strip and movable also in a direction thru the strip from a normal position of rest; a main driving shaft extending transversely of the fed strip; a normally stationary transverse shear-shaft a fly-wheel gear normally loose on the transverse shear-shaft and continuously driven by the transverse driving shaft; a transverse feed-shaft continuously driven by said fly-wheel gear; mechanism operated by the transverse feed-shaft and continuously rotating said feed-roll; a clutch fixed on the normally stationary transverse shear-shaft and cooperating with the continuously rotary fly-wheel gear normally loose thereon; mechanism dependent on the strip feed by said feeding rolls and causing intermittent operation of the clutch on the transverse shear-shaft to operate the latter; and mechanism operated by the transverse shear-shaft and operating said shearing mechanism and blade when the clutch connects the shear shaft to the fly-wheel gear normally loose thereon.

8. In a machine for fabricating long metal stock, the combination with mechanism feeding such stock lengthwise, of fabricating mechanism normally stationary but reciprocable in the line of stock-feed and including a fabricating tool movable also in a direction toward and thru the fed stock; a driving shaft located transversely of the direction of stock-feed; a normally stationary transverse fabricating-shaft; a fly-wheel gear normally loose on the transverse fabricator-shaft but continuously driven by the transverse driving shaft; a transverse feed-shaft; speed reducing transmission between said fly-wheel gear and said feed-shaft and continuously operating the latter; mechanism operated by the transverse feed-shaft and continuously operating said feeding mechanism; a clutch fixed on the transverse fabricator-shaft and intermittently cooperating with said fly-wheel gear thereon; mechanism dependent on the stock-feed by said feeding mechanism and causing intermittent operation of said clutch on the normally stationary transverse fabricator-shaft to operate the latter; and mechanism operated by the fabricator-shaft and causing operation of said fabricating mechanism when the clutch connects the fabricator-shaft to the fly-wheel gear.

9. In a machine for fabricating long metal stock at successive portions of its length, the combination with mechanism continuously feeding the stock lengthwise, of normally stationary fabricating mechanism reciprocable along the line of stock feed and including a fabricating tool also movable at substantially right angles to the direction of stock-feed; mechanism operating said fabricating mechanism; a drive-shaft, a half-revolution clutch the driven member of which is continuously driven by said drive-shaft but the driving member of which is connected to said mechanism operating the fabricating mechanism; and mechanism dependent on the stock-feed by said feeding mechanism and intermittently coupling said clutch-members to connect said drive shaft with said operating mechanism at times dependent on the stock feed by said feeding mechanism.

10. In a machine for shearing a wide but relatively long metal strip successively, at successive portions of its length, into shorter lengths, the combination with mechanism continuously feeding the strip lengthwise, of wide normally stationary shear-blades arranged transversely of the fed strip at opposite faces thereof; mechanism effecting broadside reciprocation of both said blades in the line of strip-feed over a distance short relative to the sheared sub-length, and simultaneously moving one of the blades edge on, to and from a face of the strip and thru the strip; two shafts driving said blade-operating mechanism; a third shaft driving said pair of shafts; mechanism for rotating said third shaft; mechanism connecting said rotating mechanism to said third shaft at times dependent on the strip-feed by said feeding mechanism; and braking mechanism acting on said third shaft at least at all times when said mechanism for rotating said shaft is not connected to it.

11. In a machine for shearing a wide and longer metal strip successively at successive portions of its length, into shorter sub-lengths, the combination with mechanism continuously feeding the strip lengthwise, of a normally stationary shear-stand adjacent said feeding mechanism receiving the strip therefrom and reciprocable lengthwise of the fed strip over a distance short relative to the sheared sub-lengths and exclusively rectilinearly; a blade-carrier arranged transversely of the strip and reciprocable in said shear-stand to and from a face of the strip; a shear-blade on said carrier and a drive-shaft both arranged transversely of the fed strip, and the shearing edge of said blade being inclined transversely of the strip to lie at progressively different distances from the wide face thereof; a shear-shaft driven by said drive-shaft and also arranged transversely of the fed strip; and a plurality of eccentrics arranged successively along said transverse shear-shaft and successively arranged to effect reciprocation of said shear-stand and to effect reciprocation of said carrier and blade to and from and across the line of feed of the strip simultaneously with the reciprocation of the shear-stand and cause the inclined blade to pass thru the strip progressively from edge to edge of the strip during the brief portion of the time of travel of the shear-stand in the feeding direction of the fed strip when the speed of the tools along the strip is the same as that of the strip.

12. In a machine for shearing a wide but relatively long metal strip successively, at successive portions of its length, into shorter sub-lengths, the combination with mechanism continuously feeding the strip lengthwise, of a normally stationary shear-stand adjacent said feeding mechanism receiving the strip therefrom and reciprocable lengthwise of the fed strip exclusively rectilinearly; a blade-carrier arranged transversely of the strip and reciprocable in said stand to and from a face of the fed strip; a shear-blade fixed to said carrier and arranged transversely of the strip and movable across the path of strip-feed and with its shearing edge inclined to lie at progressively different distances from the strip between the edges thereof; a shear-shaft arranged transversely of the fed strip; a plurality of eccentrics arranged successively along said transverse shear-shaft and imparting said motions to the shear-stand and inclined-edge blade; shear-driving mechanism of substantially large inertia and mounted independently of the shear-stand; clutching means normally disconnecting said driving means from said shear-shaft; and adjustable mechanism dependent on the strip-feed by said continuously operating feeding mechanism and arranged to operate said clutching means to connect said heavy driving mechanism to said shear-shaft and force, via said eccentrics thereon, the inclined blade thru the strip progressively from edge to edge thereof while the reciprocable shear-stand, reciprocable blade carrier and inclined blade are being moved in the same direction as the fed strip and during the small portion of said time while the shear-stand and inclined-edge blade are moving along the strip at the same rate as the strip; said clutching means, for said timely shearing movement of the inclined blade including wedging rolls which cooperate with said clutch-operating means in instantly connecting said shear-stand to said heavy driving means at the times intended by the adjustment of said clutch-operating mechanism, thereby preventing injury to machine or strip and causing production of truly uniform lengths of sheared strip sub-lengths.

13. In a machine for fabricating long relatively narrow metal stock successively at successive portions of its length, the combination with mechanism feeding the stock lengthwise, of fabricating mechanism reciprocable as a whole in the line of stock-feed and including a fabricating tool reciprocable to and from the stock; two shafts arranged transversely of the stock; eccentrics on said shafts and driving said fabricating mechanism and tool; a gear on each end of each of said eccentric shafts; a shear-drive-shaft arranged transversely of the fed stock; gears on each end of said drive-shaft and respectively meshing with said pairs of adjacent gears on the eccentric-shafts; and mechanism operating said shear-drive-shaft intermittently together with the two gears on its two ends at times which have a predetermined relation to the stock-feed by said feeding mechanism and to the desired distances between fabricated portions of the stock.

14. In a machine for shearing a wide but relatively long metal strip successively at successive portions of the length, into shorter lengths, the combination with mechanism feeding the strip lengthwise, of a normally stationary shear-stand adjacent said feeding mechanism receiving the fed strip therefrom and reciprocable to and from the feeding mechanism; a shear-blade on said shear-stand and a drive-shaft, both arranged transversely of the fed strip; two additional shafts also arranged transversely of the strip, both rotated from said drive-shaft; mechanism operated by one of said additional shafts and continuously operating said feeding mechanism; a member mounted and reciprocable in said shear-stand to and from the plane of the strip; an eccentric on the other of said additional shafts and engaging said reciprocable member to effect reciprocation thereof; and mechanism intermittently interrupting the operation of said eccentric shaft by said drive-shaft at times dependent on the strip-feed by said feeding mechanism.

15. In a machine for shearing a wide but relatively long metal strip successively, at successive portions of its length, into shorter sub-lengths, the combination with mechanism feeding the strip lengthwise, of a normally stationary shear-stand adjacent said feeding mechanism receiving the strip therefrom and reciprocable lengthwise of the strip exclusively rectilinearly; an actuator mounted in said stand for reciprocation therein to and from a face of the strip; a shear-carrier mounted in said actuator for reciprocation to and from a face of the strip, said carrier being arranged transversely of the strip; a shear-blade fixed to said carrier, with its shearing edge arranged transversely of the strip but inclined to lie at progressively different distances from the strip between the edges thereof; a shear-shaft arranged transversely of the strip; an eccentric of given throw arranged on said shear-shaft and engaging said actuator to reciprocate the shear-stand rectilinearly along the path of strip-feed; and a second eccentric of greater throw than the first and arranged on said shear-shaft and engaging said blade-carrier to reciprocate the inclined shear-blade across the path of feed of the strip at a rate coordinated with the duration of reciprocation movement of the shear-stand by the eccentric of smaller throw and coordinated with the strip-feed by said feeding mechanism, whereby the inclined-edge blade will be forced thru the strip within the comparatively short time of forward travel of the inclined-edge blade when it is moving at the same speed as the strip.

16. In a machine for shearing a wide but relatively long metal strip successively, at successive portions of its length, into shorter sub-lengths, the combination with mechanism feeding the strip lengthwise, of a normally stationary shear-stand adjacent said feeding mechanism receiving the strip therefrom exclusively rectilinearly and reciprocable along the line of strip-feed; a shear-blade fixed to said shear-stand and extending transversely of the strip; an actuator for said shear-stand, mounted and reciprocable thereon to and from the plane of the fed strip; a shear-shaft; an eccentric on said shaft and engaging with said actuator to reciprocate it and thereby reciprocate said shear-stand rectilinearly; a second shear-blade also arranged transversely of the fed strip; a carrier for said second shear-blade and mounted reciprocably to and from the plane of the fed strip; a second eccentric on said shear shaft and connected with said second blade carrier, reciprocating it in the direction of rectilinear reciprocation of the shear stand actuator; driving means and connections therefrom continuously operating the strip-feeding mechanism; and mechanism intermittently causing rotation of said eccentric shaft by said driving means.

17. In a machine for shearing a wide but relatively long metal strip successively, at successive portions of its length, into shorter sub-lengths, the combination with a roll-stand including feeding rolls arranged transversely of the strip and engaging the two surfaces thereof, of a normally stationary shear-stand adjacent said roll-stand and reciprocable along the line of strip-feed; a shear-blade fixed to said carrier and extending transversely of the strip; a member mounted in and reciprocable thru said shear-stand to and from the plane of the strip; a second shear-blade cooperating with the first and also carried by the shear-stand and arranged transversely of the strip but reciprocable to and from the plane; two blade-operating shafts arranged transversely of the strip and both located in a plane parallel with the plane of the fed strip; eccentrics on said shafts, said eccentrics being arranged to reciprocate said member mounted in the shear-stand and thereby reciprocate the latter; a normally stationary shear-shaft also arranged transversely of the strip and connected for rotating both said blade-operating shafts at the same rate; driving means and connections therefrom continuously rotating the feeding rolls of said roll-stand; and mechanism intermittently rotating said normally stationary shear-shaft by said driving means.

18. In a machine for fabricating long metal stock, successively, at successive portions of its length, the combination with mechanism feeding such stock lengthwise, of a normally stationary tool-stand reciprocable along the line of stock-feed; a member mounted in and reciprocable thru said tool-stand to and from the stock; a fabricating tool also carried by said tool stand but reciprocable to and from the stock; two tool-operating shafts in a plane parallel with the line of stock-feed and mounted independently of said tool stand; eccentrics on said shafts, said eccentrics being arranged to reciprocate said member mounted in the tool-stand; a normally stationary fabricator-shaft connected for the rotation of both said tool-operating shafts at the same rate; driving means and connections therefrom continuously operating said feeding mechanism, and mechanism intermittently rotating said normally stationary fabricator-shaft by said driving means.

19. In a machine for shearing a wide but relatively long metal strip successively, at successive portions of its length, into shorter sub-lengths, the combination with mechanism feeding the strip lengthwise, of a normally stationary shear-stand adjacent said feeding mechanism, extending transversely of the fed strip and reciprocable along the line of the strip feed; a member extending transversely of a strip and mounted in and reciprocable thru said shear-stand to and from the plane of the strip; a shear-blade also carried by the shear-stand transversely of the strip but reciprocable to and from the strip plane; two blade-operating shafts arranged transversely of the strip and both located in a plane parallel with the fed strip; a plurality of eccentrics on each of said shafts located successively transversely of the strip and reciprocating said member mounted reciprocably in the shear-stand and thereby reciprocating the latter and said transverse blade; a normally stationary shear-shaft also arranged transversely of the strip and connected for the rotation of both said eccentric-carrying blade-operating shafts at the same rate; driving mechanism and connections therefrom continuously operating said feeding mechanism; and mechanism intermittently rotating said normally stationary shear-shaft by said driving means.

20. In a machine for shearing a wide but relatively long metal strip successively, at successive portions of its length, into shorter sub-lengths, the combination with mechanism for feeding the strip, lengthwise of a blade-carrier adjacent said feeding mechanism, extending transversely of the fed strip and reciprocable exclusively rectilinearly along the line of strip feed, a blade fixed in said carrier and extending transversely of the strip; a second blade-carrier mounted in and reciprocable thru the first carrier to and from the plane of the fed strip and reciprocable in the direction of rectilinear reciprocation of the first carrier, a shear-blade fixed in said second carrier and extending transversely of the strip; a normally stationary blade-operating shaft arranged transversely of the strip and mounted independently of said reciprocable blade carrier; a plurality of eccentrics on said shaft located successively transversely of the strip and reciprocating said carriers reciprocating the first carrier rectilinearly and reciprocating the second carrier in the direction of rectilinear reciprocation of the first; driving mechanism and connections therefrom continuously operating said feeding means; and mechanism intermittently rotating said normally stationary blade-operating shaft by said driving means.

21. In a machine for shearing a wide but relatively long metal strip into shorter but equal sub-lengths the combination with mechanism for feeding the long strip lengthwise, of normally stationary shearing mechanism reciprocable longitudinally of the strip and including two shearing blades extending transversely of the strip one of them being reciprocable to and across the strip and alongside and across the other blade, and the other being reciprocable exclusively rectilinearly along the length of the strip and in the plane of revolution of the first-blade; mechanism continuously operating said feeding mechanism; mechanism for reciprocating said second blade rectilinearly along the length of the strip and reciprocating said first blade to and across the strip perpendicular to the direction of rectilinear reciprocation of the second blade along the length of the strip; continuously operating driving means operating said feed-operating mechanism; a clutch located between said driving means and said shear-operating mechanism; means normally locking said clutch in condition preventing the driving means from operating the shear-operating mechanism; means dependent on the strip-feed and intermittently operating said locking means to release said clutch and cause the driving means to operate said shear-operating mechanism; said clutch including wedging rolls cooperating with said clutch-operating means and causing instantaneous starting of said intermittent movements of the shearing blades upon operation of said clutch-operating means thereby causing the production of uniform sheared sub-lengths of the strip by causing successive strip-shearing operations at the times intended by said clutch-operating means; and means controlled by the operation of the strip-shearing mechanism and restoring said locking means to its normal condition disconnecting the driving means from the shear-operating mechanism.

22. In a machine for shearing a wide but relatively long metal strip successively into shorter but equal sub-lengths, the combination with mechanism for feeding the long strip lengthwise, of mechanism continuously operating said feeding mechanism; normally stationary shearing mechanism including a shear-stand and cooperating wide shearing blades extending transversely of the strip and a carrier for one of said blades reciprocable relative to the shear-stand to and from a face of the strip, the shear-stand itself being reciprocable along the line of strip-feed; a shear-shaft mounted independently of said shear-stand; mechanism connecting the shear-shaft to operate the shear-stand and the reciprocable blade-carrier therein; a drive-shaft; a pinion thereon; a fly-wheel gear meshing with said pinion and loosely mounted on the shear-shaft; a clutch mounted on said shear-shaft; and mechanism dependent on the strip-feed and intermittently operating said clutch causing it to connect said continuously rotating fly-wheel gear with said shearing apparatus by way of the shear-shaft and shear-operating apparatus said clutch including wedging rolls cooperating with said clutch-operating means and causing instantaneous starting of said intermittent movements of the shearing blades upon operation of said clutch-operating means thereby causing the production of uniform sheared sub-lengths of the strip by causing successive strip-shearing operations at the times intended by said clutch-operating means.

In testimony whereof I hereunto affix my signature.

JOSEPH H. ROBERTS.